US010397019B2

(12) United States Patent
Hartung et al.

(10) Patent No.: US 10,397,019 B2
(45) Date of Patent: Aug. 27, 2019

(54) AUTONOMOUS VEHICLE PLATFORM AND SAFETY ARCHITECTURE

(71) Applicant: POLYSYNC TECHNOLOGIES, INC., Portland, OR (US)

(72) Inventors: Joshua John Hartung, Portland, OR (US); Peter Brink, Portland, OR (US); Jonathan Lamb, Portland, OR (US); David Paul Miller, Portland, OR (US)

(73) Assignee: PolySync Technologies, Inc., Portland, OR (US)

( * ) Notice: Subject to any disclaimer, the term of this patent is extended or adjusted under 35 U.S.C. 154(b) by 237 days.

(21) Appl. No.: 15/353,672

(22) Filed: Nov. 16, 2016

(65) Prior Publication Data

US 2017/0139411 A1 May 18, 2017

Related U.S. Application Data

(60) Provisional application No. 62/256,092, filed on Nov. 16, 2015.

(51) Int. Cl.
*H04L 12/40* (2006.01)
*G05D 1/00* (2006.01)

(52) U.S. Cl.
CPC .......... *H04L 12/40* (2013.01); *G05D 1/0077* (2013.01); *H04L 2012/40273* (2013.01)

(58) Field of Classification Search
CPC .................... H04L 12/40; H04L 12/40006
See application file for complete search history.

(56) References Cited

U.S. PATENT DOCUMENTS

2015/0331422 A1* 11/2015 Hartung ................ G05D 1/021
701/23
2017/0123428 A1* 5/2017 Levinson ............ G05D 1/0214

* cited by examiner

*Primary Examiner* — Anne M Antonucci
*Assistant Examiner* — Renee LaRose
(74) *Attorney, Agent, or Firm* — Klarquist Sparkman, LLP

(57) ABSTRACT

In embodiments of an autonomous vehicle platform and safety architecture, safety managers of a safety-critical system monitor outputs of linked components of the safety-critical system. The linked components comprise at least three components, each of which is configured to produce output indicative of a same event independent from the other linked components by using different input information than the other linked components. The safety managers also compare the outputs of the linked components to determine whether each output indicates the occurrence of a same event. When the output of one linked component does not indicate the occurrence of an event that is indicated by the outputs of the other linked components, the safety managers identify the one linked component as having failed. Based on this, the outputs of the other linked components are used to carry out operations of the safety-critical system without using the output of the failed component.

20 Claims, 21 Drawing Sheets

ABSTRACT

AUTONOMOUS VEHICLE PLATFORM AND SAFETY ARCHITECTURE

RELATED APPLICATION

This application claims priority to U.S. Provisional Patent Application Ser. No. 62/256,092 filed Nov. 16, 2015 entitled "Autonomous Vehicle Platform and Simulation," the disclosure of which is incorporated by reference herein in its entirety.

BACKGROUND

Autonomous vehicles are developed to navigate and operate either unmanned or to assist a vehicle operator, and can utilize many different types of sensors, automation, robotics, and other computer-controlled systems and mechanisms. Inherently, autonomous vehicles are also developed with many active safety systems, which can not only increase driver comfort and reduce fatigue, but also reduce and/or eliminate vehicle injuries and deaths resulting from motor vehicle accidents. However, the many automated systems, sensors, and algorithms developed for use in an autonomous vehicle are costly and require considerable expertise to implement. Further, automobile companies and other vehicle manufacturers must each develop their own team of core competencies, technology infrastructure, and proprietary systems, which can be difficult and is cost prohibitive to include in mainstream consumer vehicles. To remain competitive in the marketplace, the companies and manufacturers that are unable to develop the internal competencies will need to partner with third parties that provide the autonomous vehicles systems. Likely, this will significantly decrease time to market for new vehicles and will tie a company to a third party proprietary system, which may be undesirable.

FIG. 1 illustrates an example of a conventional autonomous vehicle system 100, to include features of active safety systems. Generally, the autonomous vehicle system is representative of systems that include a centralized logging and data processing computer that receives sensor data input from a multitude of different sensors and components. Typically, these centralized systems have limited feature sets, as well as a lack of platform, sensor, and interface compatibility. Further, these centralized systems are susceptible to failure and can unexpectedly shut-down, such as due to cascading errors that cause the system to lockup, resulting in operation failure and potential loss of the autonomy platform. For example, an obstruction in the pathway of a vehicle may cause an unexpected failure of the simultaneous localization and mapping (SLAM) algorithm at 102, causing the fusion calculations of the ego motion to no longer converge at 104. Data flow through the ego motion (e.g., data received and communicated) can become blocked or stalled, resulting in a failure of the path planner at 106, and rendering the autonomous vehicle system inoperable and/or the vehicle immobile.

SUMMARY

This Summary introduces features and concepts of an autonomous vehicle platform and safety architecture, which is further described below in the Detailed Description and/or shown in the Figures. This Summary should not be considered to describe essential features of the claimed subject matter, nor used to determine or limit the scope of the claimed subject matter.

An autonomous vehicle platform and safety architecture are described. In embodiments, safety managers implemented as components of a safety architecture for a safety-critical system (e.g., an autonomous vehicle) monitor outputs of linked components of the safety-critical system. The linked components comprise at least three components, each of which is configured to produce output indicative of a same event independent from the output of the other linked components by using different input information than the other linked components. The safety managers of the linked components also compare the outputs of the linked components to determine whether each of the outputs indicates the occurrence of a same event. When the output of one linked component does not indicate the occurrence of an event that is indicated by the outputs of the other linked components, the safety managers identify the one linked component as having failed. Based on this, the outputs of the other linked components are used to carry out operations of the safety-critical system without using the output of the failed component.

Further, the output of the failed component may not be used again until the failed component has been restored. The safety managers can attempt to restore a failed component, e.g., by resetting the failed component, until output of the failed component meets criteria that describe output characteristics indicative of normal operation of the component. After a component is restored, output of the restored component is again included with the outputs of the linked components in comparisons for determining whether the outputs indicate the occurrence of a same event.

BRIEF DESCRIPTION OF THE DRAWINGS

Embodiments of an autonomous vehicle platform and safety architecture are described with reference to the following Figures. The same numbers may be used throughout to reference like features and components that are shown in the Figures.

DETAILED DESCRIPTION

Figure 1:
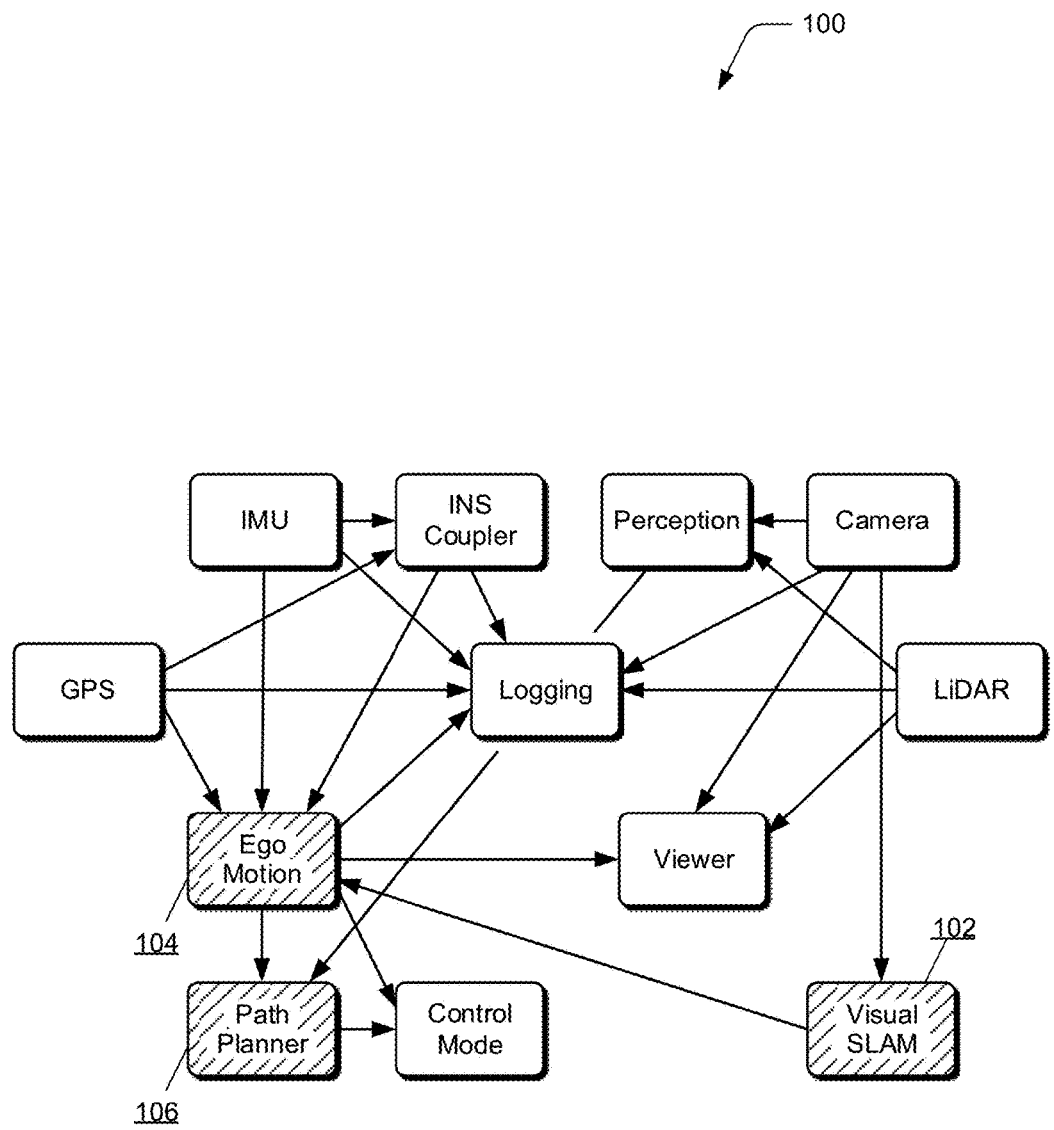
FIG. 1 illustrates an example of a conventional autonomous vehicle system that is implemented with a centralized logging and data processing computer.

Embodiments of an autonomous vehicle platform and safety architecture are described. To incorporate vehicle components from a variety of different component developers, autonomous vehicle systems can be implemented as distributed sensor system architectures that abstract low-level sensor detection and processing to a high-level application programming interface (API). This enables a standard to be implemented by many different vehicle component developers, which makes update and maintenance of the components easier and allows for future compatibility. The distributed sensor system architecture is modular, having multiple sensor processing nodes, and includes a real-time data bus for data communication between the sensor processing nodes. This distributed architecture enables a system sensor node or processing node to be exchanged, bypassed, or reconfigured for a wide variety of applications, while abstracting the low-level data handling to a higher-level API that then interfaces with a vehicle manufacturer's proprietary system.

While features and concepts of an autonomous vehicle platform and safety architecture can be implemented in any number of different devices, systems, networks, environments, architectures, and/or configurations, as well as for any distributed sensing and control system, embodiments of an autonomous vehicle platform and safety architecture are described in the context of the following example devices, systems, and methods.

Safety is a concern of paramount importance greatly affecting the development and widespread adoption of autonomous vehicles. This includes the safety of passengers and cargo within an autonomous vehicle, the safety of passengers and cargo in other vehicles (autonomous and human-controlled), pedestrians, property, and so forth. Functional safety is a measure that organizations, such as auto manufacturers, can use to claim that a given system is "safe" to a variable degree. The degree to which a system is safe is dictated by several attributes, including degree and exposure, which describe the potential for human injury, loss of life, or destruction of property and the relative frequency with which those are predicted to occur. In terms of human injury, loss of life, or property destruction, for instance, there can be incredibly severe consequences for events that happen even infrequently (e.g., a total braking or steering system failure). In contrast, there can be no (or very little) consequence for some events that may happen frequently, e.g., obtaining a video frame from one of multiple front facing cameras that is missing a few pixels.

In relation to software and systems, failures can be a function of design of a system as a whole and a manner in which failures of individual components (e.g., a given hardware component) affect the ability of the system to continue operating. For example, failures can result from a manner in which system software detects failures and/or from the mitigation measures carried by the system when a failure is detected. To this extent, elimination and/or reduction of systemic failures in software and systems may be achieved through suitable system design, rather than simply through testing. In accordance with the described techniques, suitability of a system design may be predicated, at least in part, on the ability of the system to accurately detect component failures so that appropriate remedial actions can be taken. Accordingly, a system's ability to accurately detect failures, and in a timely manner, is one of the primary considerations in determining a level of functional safety of a system.

With regard to detecting faults of system components accurately and detecting them in a timely manner, consider the concept of fault tolerant time interval (FTTI). FTTI is a measure, used in a variety of safety-critical applications, that indicates an amount of time it takes a particular system to react to a failure to avoid causing an accident. This includes an amount of time it takes one or more modules of the system to detect a failure after its occurrence. FTTI also accounts for an amount of time it takes the system to determine how to respond to the detected failure and to initiate operations to handle the failure. With regard to autonomous vehicles, a rate at which a system travels may affect the FTTI. In particular, as a speed at which a system travels increases, the FTTI decreases. This is because at higher rates of speed, the system must observe events further distances away from the system to make decisions. Consequently, a top speed at which a system is capable of travelling may be used to define the FTTI of the system. The concept of a declining FTTI based on speed is typically not used in practice, instead FTTI is a fixed quantity defined by a reaction time of the system.

In general, an assumption made in the design of safe systems is that each of the components will fail. Indeed, a framework exists for analyzing failure rates of given components and ensuring that failures are detected. In connection with this, each component of a safety-critical system is associated with a failure rate. Some failure rates may be empirically determined, some may be determined based on extrapolations made using data obtained through rigorous testing, and some may be determined with historical data. In any case, these failure rates may be combined in some approaches to derive a failure rate for a given subsystem (e.g., one front facing camera), and ultimately for an entire product (e.g., an autonomous vehicle). When a failure rate for a component is above a safe threshold associated with a safety-critical subsystem or product, the subsystem or product may incorporate backup systems or diagnostics to detect when the component fails. Thus, the techniques described herein are predicated on ensuring that a failure of a component is detected, rather than simply preventing the failure, because the techniques assume that components will fail.

Unlike conventional techniques which may determine some measure of overall safety of a safety-critical system, the techniques described herein utilize system-level diagnostics to detect when safety-critical systems are not functioning properly. For example, some conventional techniques focus on detecting faults in hardware. However, these conventional techniques may not address the detected faults at a system level, such as to keep other system components running without the faulty component. With regard to autonomous vehicles, a "component" of the system may correspond to any of a variety of different vehicle components. In other applications, a component may correspond to different types of components, e.g., in a safety-critical medical system a component may refer to any of a variety of different medical device components.

In any case, as used herein, a "vehicle component" refers to any one of the many parts from which autonomous vehicles can be comprised, including wheels, tires, brakes, headlights, tail lights, brake lights, bumpers, radiators, shocks, spark plugs, and so forth. The term "vehicle component" can also refer to parts or systems for implementing autonomy in a vehicle, such as any of a variety of different sensors (e.g., LiDAR, RADAR, visible light cameras, humidity sensors, heat sensors, infrared), information acquisition systems (e.g., a global positioning system (GPS), a cellular communication system capable of receiving information over a local cellular network, a short range communication systems such as Bluetooth or near field communication (NFC) capable of receiving information from devices of a passenger or driver or from another vehicle). These parts or systems for implementing autonomy can also include hardware-specific chips or software modules to carry out algorithms for processing sensor data and acquired information so the information is usable for route planning and vehicle control to cause an autonomous vehicle to follow a planned route. Parts or systems for implementing autonomy can also include hardware and software modules to plan routes for autonomous vehicles, such as routes based on a mission objective (e.g., a destination) and conditions determined through the sensor data and acquired information (e.g., a location along a route, a location within a lane, locations of surrounding objects, upcoming traffic signs and signals). Further, the parts or systems can include hardware and software to control the vehicle to follow a planned route, such as systems that direct wheels to turn a determined amount, brakes to be applied at a determined pressure, cause the autonomous vehicle to accelerate a determined amount, and so forth. Vehicle components may comprise a variety of other parts or systems without departing from the spirit or scope of the techniques described herein.

In one or more embodiments, portions of the autonomous vehicle platform and simulation are built on a safety architecture. The safety architecture is designed and configured to address component failures so that a safety-critical system can continue operating safely despite failure of individual components. In other words, the safety architecture enables safety-critical systems to continue safe operation in degraded states, e.g., when one or more components fail to work as designed. By way of example, the safety architecture is configured to determine when information from a given sensor is unreliable. Based on such a determination, the safety architecture is configured to adapt to operate without using the information from that sensor, using the information but with a low measure of confidence relative to information obtained from other sensors, and so forth. When the safety architecture detects a component failure, the safety architecture can designate a degraded mode for operation of a safety-critical system. In the degraded mode, the safety-critical system is considered reliable enough to continue operating.

Example Environment

Figure 2:
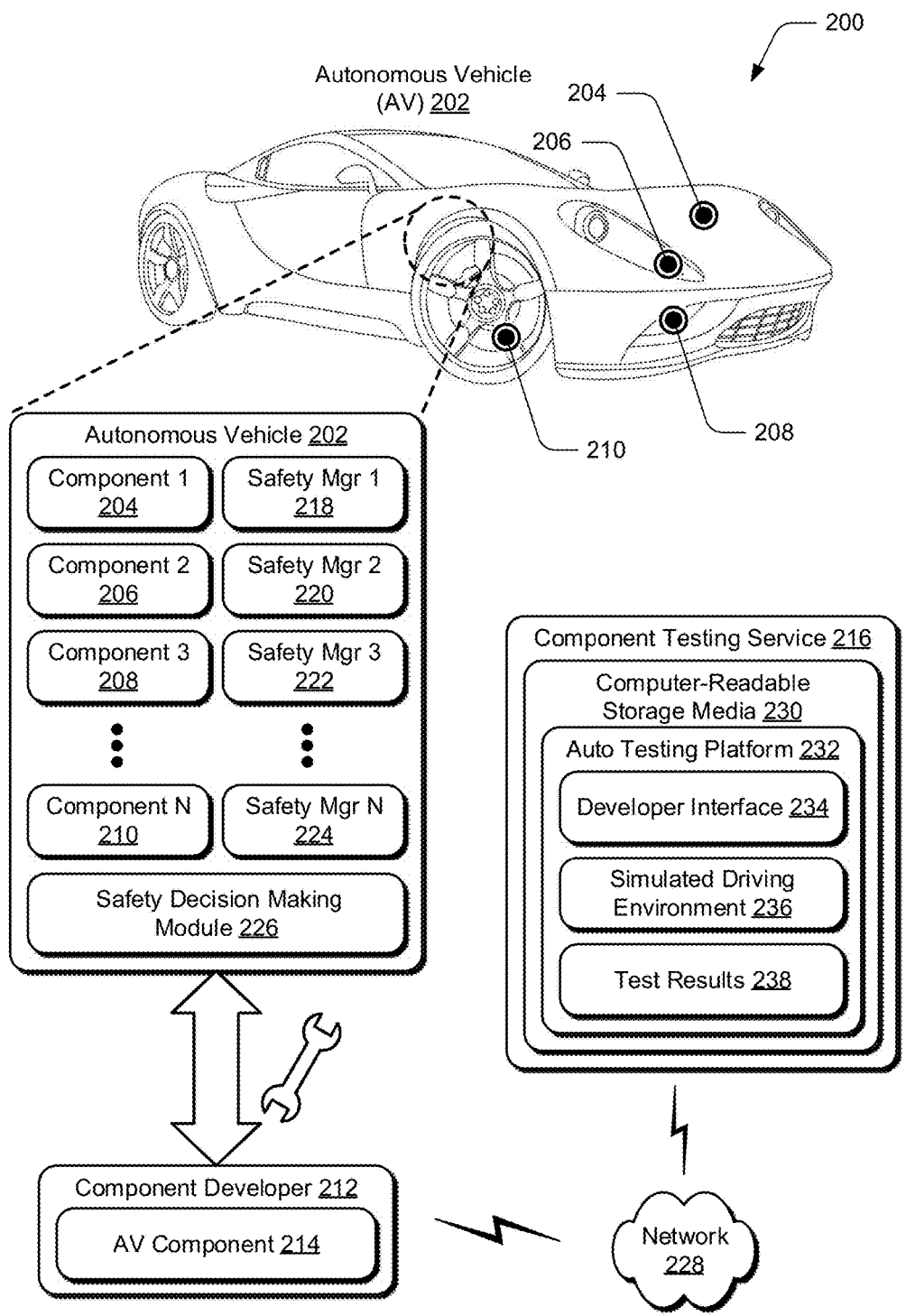
FIG. 2 illustrates an example environment that is operable to employ an autonomous vehicle platform and safety architecture in accordance with one or more embodiments.

FIG. 2 is an illustration of an environment 200 in an example implementation that is operable to employ an autonomous vehicle platform and safety architecture in accordance with one or more embodiments. The illustrated environment 200 includes autonomous vehicle 202 which has multiple vehicle components, including component one 204, component two 206, component three 208, and so on to component N 210.

The illustrated environment 200 also includes component developer 212 which represents functionality to develop any of a variety of different components for the autonomous vehicle 202. Given this functionality, the component developer 212 is illustrated with autonomous vehicle (AV) component 214, which may correspond to a component being developed or already developed by the component developer 212. By way of example, the AV component 214 may correspond to any one of the components depicted as part of the autonomous vehicle 202, different components for the autonomous vehicle 202, and/or components for different autonomous vehicles. The ability of the component developer 212 to integrate the AV component 214 into the autonomous vehicle 202 is illustrated through the depicted connecting arrow and wrench tool. The illustrated environment also includes component testing service 216, which represents functionality to enable the component developer 212 to test the AV component 214 and determine whether the AV component 214 is safe for incorporation in an autonomous vehicle.

In addition to the components introduced above, the autonomous vehicle 202 is also illustrated with a safety manager for each of the components. In particular, the autonomous vehicle 202 includes safety manager one 218, safety manager two 220, safety manager three 222, and so on to safety manager N 224. In accordance with one or more embodiments, each component incorporated into the autonomous vehicle 202 may be associated with a safety manager. When a component is incorporated into the autonomous vehicle 202, for instance, its safety architecture may be configured to associate an instance of the safety manager with the component. In other words, there may be a one-to-one safety manager to component ratio. In the illustrated example, the safety manager one 218 may be associated with the component one 204, the safety manager two 220 associated with the component two 206, the safety manager three 222 associated with the component three 208, and the safety manager N 224 associated with the component N 210.

In general, the illustrated safety managers represent that each component or subsystem of the autonomous vehicle 202 is associated with at least one of the safety managers. These safety managers represent functionality of the described techniques to detect failures and errors at a system level. Further, although the safety managers monitor the components on a per-component basis, the safety managers also integrate into the safety architecture and are functionally and operationally isolated from other components and the safety managers associated with the other components. One advantage of this approach is that it allows developers of the safety architecture to focus on developing the safety architecture rather than how to make each individual component safe.

As discussed above and below, the safety managers are independent from the "normal" operation of the autonomous vehicle 202. As used herein, "normal operation" of an autonomous vehicle 202 refers to operations to sense conditions in a driving environment, plan a route through the environment, and control components of the autonomous vehicle 202 to drive according to the planned route. The normal operation does not include functionality to detect and mitigate failures of the components used to carry out the sensing, planning, and controlling. By way of example, a safety manager checks that the output of the associated component is accurate and is provided by the component in a timely fashion. A component may be associated with criteria indicative of normal operation, e.g., that describe a format in which the component is configured to supply data, a frequency with which the component is to supply the data (e.g., every 0.5 seconds), whether the component supplies the data when polled, and so forth. In this way, a safety manager can determine whether a component supplies data in a timely fashion. If a component fails to operate according to its criteria, the safety manager associated with the component may generate and communicate a message to safety decision making module 226. The safety decision making module 226 is configured to determine actions to take based on the detected failure.

Figure 3:
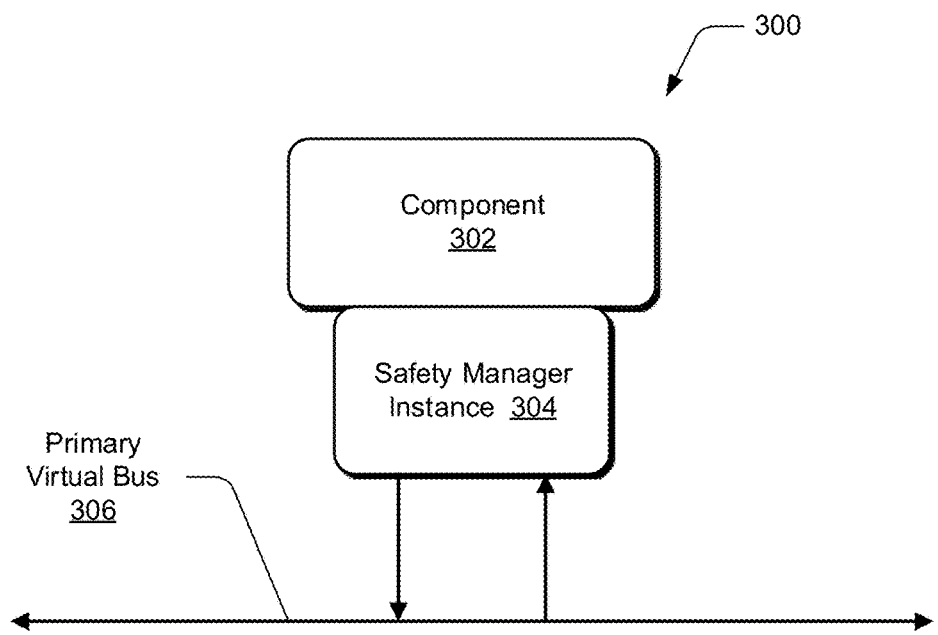
FIG. 3 illustrates an example in-band safety architecture for monitoring a component of a safety-critical system in accordance with one or more embodiments.
Figure 4:
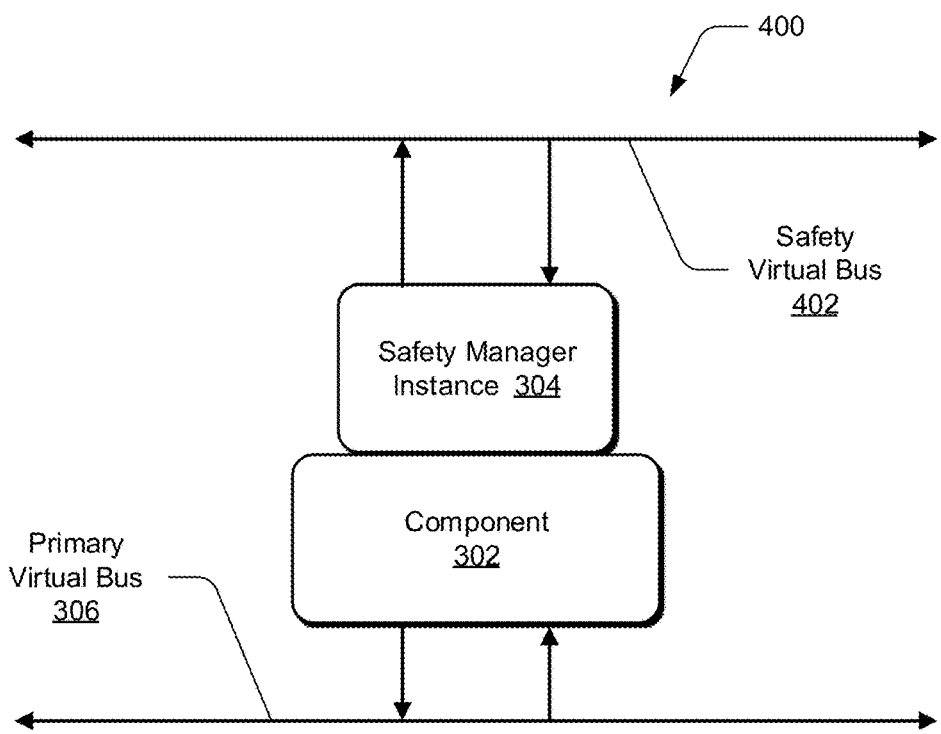
FIG. 4 illustrates an example out-of-band safety architecture for monitoring a component of a safety-critical system in accordance with one or more embodiments.
Figure 5:
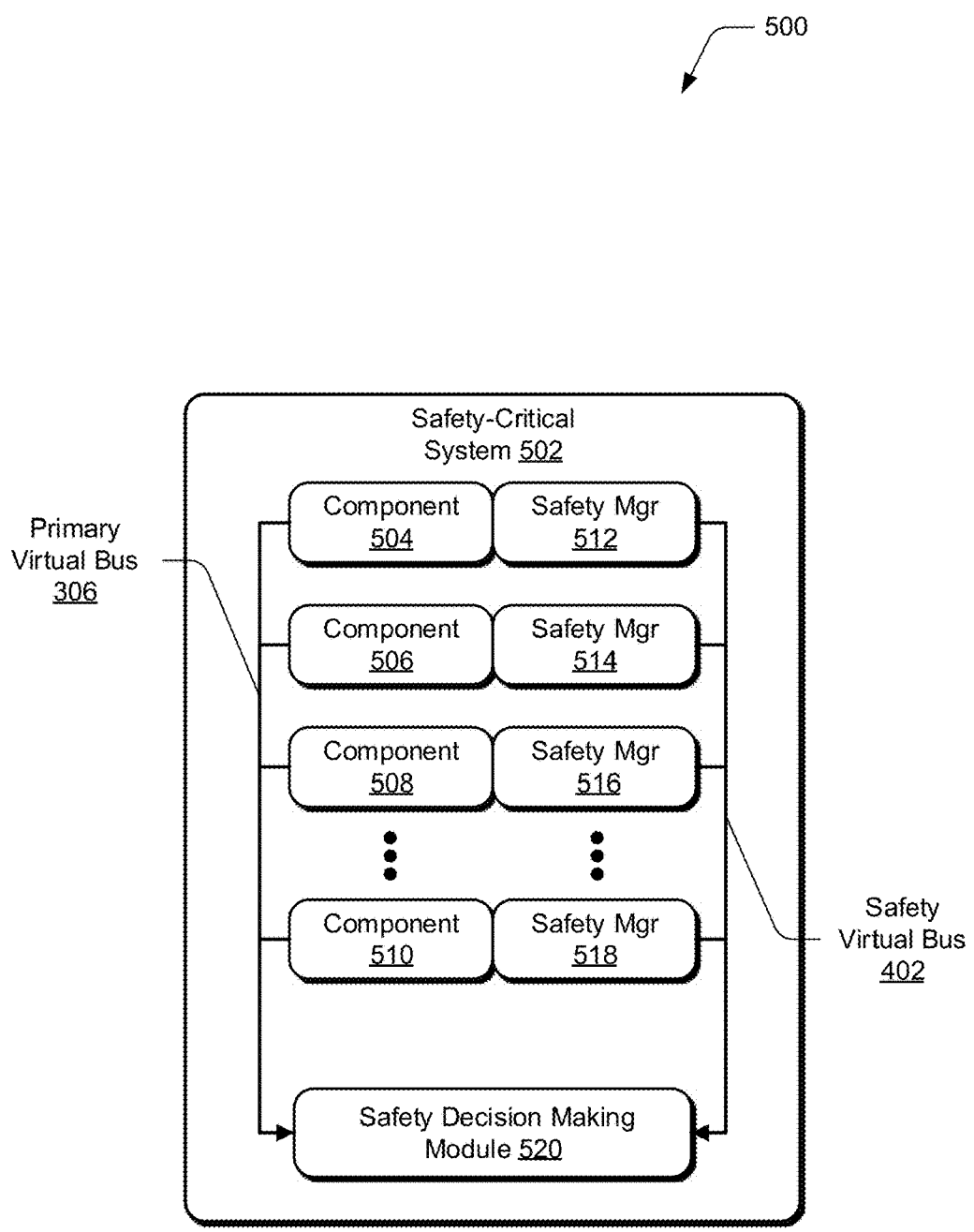
FIG. 5 illustrates an example safety architecture to address component failures in a safety-critical system in accordance with one or more embodiments.

FIGS. 3-5 describe details of the safety architecture in accordance with one or more embodiments. FIG. 3 illustrates an example in-band implementation 300 of the safety architecture for monitoring a component of a safety-critical system. The safety architecture described with reference to FIGS. 3-5 may be employed in any of a variety of safety-critical systems to monitor components of those systems for failures, determine mitigation actions to take when component failures are detected, and cause the determined actions to be performed so that the safety-critical systems can continue operating safely. As used herein, a "safety-critical system" refers to a system that, if it fails during operation, is capable of causing loss of life, injury, property destruction (of the system itself and other property), and so forth. An autonomous vehicle is but one example of a safety-critical system or systems. Indeed, the discussed safety architecture may be used for a variety of other safety-critical systems to ensure that component failures do not result in complete failure of those systems. Instead, the safety architecture allows them to continue operating, e.g., in a degraded state. Some examples of safety-critical systems include aircraft, spacecraft, industrial automation systems, medical devices, and some mobile robotics, as well as subsystems of these various safety-critical systems. The described safety architecture may be used with such safety-critical systems as well as a variety of other safety-critical systems without departing from the spirit or scope of the techniques described herein.

As mentioned above, FIG. 3 represents a scenario in which the safety architecture is implemented in-band. The illustrated in-band implementation 300 includes component 302 and safety manager instance 304. By "in-band" it is meant that the components and safety managers of a safety-critical system communicate messages over a same bus—illustrated as primary virtual bus 306. The primary virtual bus 306 can be configured as a unified subscriber and get-set data bus as described in more detail in FIG. 8.

The component 302 may correspond to any of a variety of components with which the corresponding safety-critical system is configured. In the context of autonomous vehicles, the component 302 may correspond to an autonomous vehicle component. In the context of aircraft, the component 302 may correspond to an aircraft component, and so forth. Regardless of the particular type of safety-critical system, the component 302 may communicate over the primary virtual bus 306 through the safety manager instance 304. By way of example, the component 302 may publish messages indicative of perceived conditions, a course of action planned based on perceived conditions, and/or controls for carrying out the course of action. Additionally, the component 302 may receive messages from other components over the primary virtual bus 306.

Unlike the out-of-band implementation discussed below, in the in-band implementation 300, the safety manager instance 304 also communicates over the primary virtual bus 306. For instance, the safety manager instance 304 may publish messages via the primary virtual bus 306 for other safety managers. The safety manager instance 304 may also receive messages via the primary virtual bus 306 from other safety managers. In accordance with the techniques described herein, the safety manager instance 304 is configured to monitor the component 302 to detect failures of the component 302. In particular, the safety manager instance 304 monitors output of the component 302 to check if the output meets a predetermined set of criteria specified for output of the component 302. This can include checking that a format of the data output by the component 302 meets the criteria specified for the component (e.g., matching a data structure defined by the criteria, having values within predefined ranges, and so on), and that a time at which the data is output by the component 302 meets the criteria (e.g., within a predefined threshold amount of time after receiving a request for the data, at a predefined interval of time, and so forth).

When the output of the component 302 does not meet the criteria, the safety manager instance 304 may determine that the component 302 has failed. By way of example, the safety manager instance 304 may determine that the component 302 has failed when the data output does not match the expected format and/or when the data is not output at an expected time. In response to detecting such a failure, the safety manager instance 304 can communicate a message over the primary virtual bus 306 indicating that the component 302 has failed. This allows the safety-critical architecture to determine how to mitigate the failure.

While the component 302 is in a failure state (e.g., the component has not been restored to normal operation such that its output meets the corresponding operating criteria), the safety managers of other components can indicate to those other components to adjust a manner of operation so that the operations do not involve the information from the component 302. If the component 302 can later be restored to normal operation, the safety manager instance 304 can indicate to the safety managers of those other components that the information from the component 302 is reliable and can again be used. The safety managers of those other components can then convey to the respective components that the information from the component 302 can again be used.

With regard to determining how to handle failure of a component, safety managers may communicate messages indicating component failures to a decision making module of the system, such as the safety decision making module 226 of FIG. 2. This decision making module may be configured to instruct the safety managers of components affected by the failure how to operate in view of the failure. For instance, the decision making module can instruct safety managers of components that normally use information from a failed component to operate without that information, as described above. Additionally, the decision making module can instruct the safety manager instance 304 to attempt to restore the component 302 to normal operation when it has failed, e.g., by resetting the component 302, cleaning the component, adjusting sub-components to enable normal operation, and so forth.

To enable components to switch a manner of operation to one that no longer involves information from a failed component, the safety-critical systems described herein are configured to include multiple different sources capable of providing redundant information. In particular, the safety-critical systems are configured with components to supply redundant information that is also diverse. The information supplied by different components may be redundant insofar as the information is capable of describing a same condition. By way of example, both a front-end visible light camera and a LiDAR subsystem of an autonomous vehicle may be capable of supplying information describing that an object is ahead, such as a pedestrian in an upcoming crosswalk.

However, the information supplied by the different components may be diverse insofar as the manner in which the components describe the condition may be different. For instance, the information supplied by the visible light camera is different than the information supplied by the LiDAR subsystem, e.g., the information from the visible light camera may be RGB values for pixels of an image or frames of a video and the information from the LiDAR may be laser measured distances to objects around the autonomous vehicle. Despite the different types of information, the camera and LiDAR are both capable of providing information describing a same condition, e.g., the presence of an object ahead.

In accordance with the techniques described herein, the safety-architecture is configured with at least triple modular redundancy (TMR) for fault tolerance. TMR is a subset of N-th modular redundancy, where N represents a number greater than 1. With N-th modular redundancy, N uncoupled components employ diverse calculation techniques to a set of inputs to arrive at a similar output. Consider one TMR example in which the autonomous vehicle 202 includes a front-facing camera, LiDAR, and RADAR for object detection. The corresponding components of the front-facing camera, the LiDAR, and the RADAR may employ diverse calculation techniques, which use the information provided by the respective front-facing camera, LiDAR, and RADAR, to detect the presence of an object.

By configuring the described safety-critical systems with at least TMR, the safety managers can implement decision-making processes, such as voting, to detect faults and enable continued safe operation despite component failures. In one or more embodiments, each safety manager of a safety-critical system is linked to redundant components via similar outputs. For instance, the respective components of the above-described front-facing camera, LiDAR, and RADAR may be linked because of the relation to object detection. In another autonomous vehicle example, a plurality of steering controller software components may be linked because they provide steering-angle command information. Safety managers may be linked by enumerating the linked components. By way of example, when a safety manager sends a message indicating information supplied by its corresponding component, the message may include (e.g., in a header or other field of the message) the components that supply the redundant, diverse information.

The components linked to a given component may be referred to as "peers" of the given component. In addition to enumerating peers, each of the safety managers is configured to monitor the messages published by peers for discrepancies. Consider an example in which a safety manager has information from a corresponding component and also from two of the component's peers. The safety manager is capable of detecting whether the information from each of the components is in agreement. With regard again to the object detection example, a safety manager can determine whether the information from each of the front-facing camera, the LiDAR, and the RADAR indicates the presence of an upcoming object. When the information indicates agreement (e.g., the information from the three sources each indicate there is an upcoming object), the safety managers can publish an operational message responsive to the agreement (e.g., an upcoming object is present). An operational message may indicate a sensed condition, a planned course of action, or a command or controlling a system to carry out the planned action. However, if the information from a set of peers does not indicate agreement (e.g., two of the front-facing camera, the LiDAR, and the RADAR indicate the presence of an upcoming object, but one does not), the safety managers can determine a component failure. As discussed above, when a component is in a failed state, the information supplied by the component may not be considered in determining conditions sensed, action planning, or carrying out a planned action. Instead, information supplied solely by the components that are determined to be operating as designed is considered.

Consider again the example in which the front-facing camera, the LiDAR, and the RADAR are used for object detection of the autonomous vehicle 202. In a scenario where the front-facing camera and the LiDAR produce output that indicates an object is present in front of the autonomous vehicle 202, but the RADAR does not produce such output (e.g., there is no information from the RADAR or the information from the RADAR does not indicate the object is present), the respective safety managers are configured to determine that the RADAR has failed. This is because the information produced by the RADAR does not agree with the information of the front-facing camera and the LiDAR. When a scenario like this occurs, the safety managers are configured to stop considering the information from the RADAR for determining the presence of objects. Instead, the safety managers are configured to use the information solely from the front-facing camera and the LiDAR, which indicates an object is present. A message or messages indicating that an object is present may then be communicated over the primary virtual bus 306 to planning and control components to plan a route (e.g., stop) based on the detected object and control the autonomous vehicle 202 based on the planned route (e.g., engage the brakes).

Although safety-critical systems built according to the described techniques are configured to comply with TMR, component failures may cause such systems to degrade to a point where there are fewer than three redundant, diverse components providing information for a particular output. The safety-critical systems described herein may continue operating in the degraded state as long as two remaining components for an output provide agreeing outputs, e.g., both outputs indicate the presence of an object. However, when there are two remaining operational components for a given output and the output of those components disagree, the safety managers may determine that the safety-critical system is no longer safe.

For instance, consider again the object detection example discussed above in which the front-facing camera and the LiDAR remain in operation after failure of the RADAR. If, while the RADAR is failed, the front-facing camera and the LiDAR produce inconsistent object detection output (one indicates the presence of an object the other does not), the autonomous vehicle 202 is no longer considered safe. When scenarios like this occur, safety architectures configured according to the described techniques are designed to cause the safety-critical systems to discontinue operating until a safe operating environment is restored. In connection with the autonomous vehicle 202, discontinuing operation until safe can correspond to causing the autonomous vehicle 202 to pull to the side of the road. Operations for other types of safety-critical systems may be discontinued in other ways depending on the safety-critical system, e.g., an aircraft may be landed at a nearest airport, an assembly line may be stopped, and so forth.

In any case, the described techniques enable a safety manager and its peers to determine that a component attached to the safety manager has failed. The safety manager instance 304 and its peers are capable of determining that the component 302 has failed, e.g., using one or more voting techniques that consider the output. Responsive to determining that component 302 has failed, the safety manager instance 304 may disable the component 302 and/or change its state, e.g., to a failed state which can be indicated in messages subsequently output by the component 302. By leveraging the one or more voting techniques, the safety managers may decrease the fault tolerant time interval (FTTI) by avoiding a serialized detect-signal-respond approach. Instead, the safety managers of linked components may each, substantially simultaneously, detect a component failure across a safety-critical system. Further, the safety managers are configured to detect this regardless of a physical configuration, which can lead to a faster detect-respond approach.

As mentioned above, the safety managers can use a variety of different voting techniques. These voting techniques can enable the safety managers to check for discrepancies in data provided by peers. For example, the safety managers may vote by comparing results from redundant algorithm execution, such as on different hardware, using different algorithms on different cores in parallel, using different algorithms serially on a same core, and so forth. The safety managers may further be configured to check ranges of inputs to a given process, ranges of outputs from a given process, and so on. Further, the safety managers may be configured to use an external watchdog timer to check that a given process continues executing. In one or more embodiments, however, the watchdog timer may not be capable of checking that the given process executes correctly. As used herein, a watchdog timer refers to an electronic time that is used to detect and recover from computer malfunctions. The safety managers may also be configured to filter inputs to eliminate glitches and check for statistical deviation.

FIG. 4 illustrates an example out-of-band implementation 400 of the safety architecture for monitoring a component of a safety-critical apparatus. Like FIG. 3, FIG. 4 includes the component 302, the safety manager instance 304, and the primary virtual bus 306. Unlike FIG. 3 though, FIG. 4 includes safety virtual bus 402. The safety virtual bus 402 can be configured as a unified subscriber and get-set data bus over which safety managers of the safety-critical architecture communicate about component failures and how to manage detected failures. By "out-of-band" it is meant that the safety managers communicate with each other over a different bus than the components. In the out-of-band implementation, the component 302 and other components of the safety-critical system communicate over the primary virtual bus 306. The communications of components over the primary virtual bus 306 may include, for instance, messages describing perceived conditions, messages for planning one or more actions based on the perceived conditions, and messages for carrying out the actions planned.

FIG. 5 illustrates an example safety-critical architecture 500 to address component failures in a safety-critical system in accordance with one or more embodiments. The illustrated example includes safety-critical system 502. The safety-critical system 502 corresponds to a system that, if it fails during operation, is capable of causing loss of life, injury, property destruction, and so forth. By way of example, the safety-critical system 502 may correspond to an autonomous vehicle, aircraft, spacecraft, an industrial automation system, a mobile robotics system, and so on.

The safety-critical system 502 is illustrated with components 504, 506, 508, and 510, which represent functionality to carry out some aspect of operation of the safety-critical system 502 outside of detecting component failure and failure management. By way of example, the components 504, 506, 508, and 510 may be configured to carry out functionality associated with perceiving conditions in the environment (e.g., a location of an autonomous vehicle, location of other objects in the environment), planning one or more actions based on the perceived conditions (e.g., planning a route for the autonomous vehicle), and carrying out the actions planned (e.g., publishing control messages that cause the autonomous vehicle to follow the planned route). The components 504, 506, 508, and 510 may be configured to carry out such functionality, at least in part, by communicating with one another over the primary virtual bus 306, which may be configured as described above and below.

The safety-critical system 502 is also illustrated with safety managers 512, 514, 516, 518, these represent functionality to detect failures of one or more of the components 504, 506, 508, and 510 and to handle detected failures, as discussed above and below. The safety managers may be associated with the components on a one-to-one basis, such that the safety manager 512 is associated with the component 504, the safety manager 514 is associated with the component 506, the safety manager 516 is associated with the component 508, and the safety manager 518 is associated with the component 510. The safety managers may be instantiated on a per-component basis, such that when a new component is added to the safety-critical system 502, a new safety manager is created or instantiated to detect and handle failures for the new component. Similarly, when a component is removed from the safety-critical system 502 the safety manager associated with the component can be deleted. In other implementations, any one or more of the safety managers may be associated with any one or more of the components in a one-to-many relationship or in a many-to-one relationship. Further, although the safety managers and the components of the safety-critical system 502 are shown and generally described as separate and independent components, a component developed for the safety-critical system 502 may include, or be integrated with, an associated safety manager.

The safety managers 512, 514, 516, 518 represent functionality to monitor the associated component for failures. Furthermore, the safety managers represent functionality to monitor outputs (e.g., messages) of components linked to the associated component for failures. The safety managers may monitor the linked components using one or more voting techniques as described above and below. In addition to monitoring the components 504, 506, 508, and 510, the safety managers represent functionality to determine actions to take when components fail and to carry out determined actions.

In one or more embodiments, the safety-critical system includes safety decision making module 520. The safety decision making module 520 represents functionality to make safety-related decisions along with the safety managers 512, 514, 516, 518. These safety-related decisions include the above-described determining actions to take when a component fails and controlling the safety managers to carry out the determined actions. The safety decision making module 526 may be configured as a high-confidence component capable of reducing a cost of the safety-critical system 502. The cost may be reduced because coupling the safety decision making module 520 to both the primary virtual bus 306 and to the safety virtual bus 402 allows the system to be configured without using separate high-confidence safety decision-making components for each of the components 504, 506, 508, and 510.

Through the coupling to the primary virtual bus 306 and the safety virtual bus 402, the safety decision making module 520 is capable of monitoring messages published to both virtual busses. The safety decision making module 520 is configured to monitor the published messages to assign a confidence to the components 504, 506, 508, and 510. As used herein, a "confidence" refers to a measure indicative of a likelihood that a given component is operating without failure, will continue to operate without failure, and/or outputs accurate data. A "high-confidence" component thus refers to a component that is determined unlikely to be in a failure state and/or is unlikely to fail in the future. In contrast, a "low-confidence" component is one that is determined likely to be in a failure state and/or likely to fail in the future. The confidence is a relative measure such that high-confidence components are determined less likely to fail than low-confidence components.

Furthermore, the confidence determined for a given component may change over time. By way of example, the safety decision making module 520 may determine that the confidence in a component is high when information published by the component meets each of its specified criteria, e.g., the information includes values within an expected range and is supplied at a particular time. The safety decision making module 520 may determine a lesser confidence in the component, however, when the information published by the component includes values outside the expected value but within some threshold of the expected values. The safety decision making module 520 may determine an even lesser confidence in the component if the information published by the component includes values further from the expected values, e.g., beyond the threshold. The confidence of a component may be determined, increased, or decreased based on a variety of different factors without departing from the spirit or scope of the techniques described herein.

In any case, a relative confidence associated with a failing component allows the safety decision making module 520 to make a determination as to whether to exclude information supplied by the failing component from a calculation. By way of example, when the failed component is a sensor capable of sensing a condition, the relative confidence allows the safety decision making module 520 to determine to exclude the sensor's information from calculations for planning actions of the safety-critical system 502. This is effective to increase the confidence in the overall system and the decision made by the system.

Unlike conventional safety architectures, the described safety architecture monitors the outputs of the components 504, 506, 508, and 510. The outputs of the components are monitored rather than each of the conditions that may lead to faults of those components. This is important in the case of autonomous vehicles because a deterministic set of possible faults to be mitigated is so large that developing the set is impractical. By way of example, there may be a variety of effects on system safety of losing 5 of 20,000 pixels in an image detector. In some conditions losing 5 of 20,000 pixels may lead to failures, however, there may be many more conditions in which losing the 5 pixels has no effect on the system whatsoever.

By analyzing component output, the described techniques can make safe decisions using non-deterministic algorithms, such as machine learning, neural networks, biologically-inspired computing techniques, and so forth. This allows the safety-critical system 502, e.g., the safety decision making module 520 and the safety managers 512, 514, 516, 518, to use both static program instructions and machine learning techniques. As a result, the safety-critical system 502 may learn to handle complex scenarios and may also be resilient when component failures occur.

In accordance with one or more embodiments, each component of the safety-critical system 502 is implemented independently from the other components, such that each component may be capable of consuming some data and outputting other data. Although the described techniques are used to determine how to safely operate multiple components, such determinations are made under the assumption that one component can fail at a time. Given this, components configured according to the described techniques are capable of continuing to operate without receiving the data of a failed upstream data producer—though the component may use the data from the upstream data producer when it is not failed. An example of this is discussed above in relation to the front-facing camera, LiDAR, and RADAR scenario. In one or more embodiments, the safety-critical system 502 may be configured to employ a sensor fusion algorithm to improve accuracy of data combined from different components, e.g., both when a linked component has failed and when there is no failure among linked components.

The safety managers 512, 514, 516, 518 and the safety decision making module 520 are configured to determine a measure of input independence of the different components. Based on the determined input independence, the safety managers and the safety decision making module 520 can also determine the extent to which different components examine overlapping inputs. Analysis of the input independence and the overlap can be used to determine gaps in the inputs covered by the different components. By way of example, the analysis can determine that only two components are capable of object detection above an autonomous vehicle.

The safety managers 512, 514, 516, 518 and the safety decision making module 520 are also configured to extend this coverage determination to hardware failures, which can be analyzed as failures of multiple components simultaneously. With the capability to handle multiple hardware failures (transient or otherwise), the described techniques may be used for both fail safe and fail operational systems. Further, the safety managers and the safety decision making module 520 represent functionality to examine a subset of system components to determine an amount of overlap between the input of those components. This allows the safety managers and the safety decision making module 520 to calculate coverage of the subset of components. In connection with confidences determined for the subset of components, the described techniques are capable of ascertaining a degree to which the determined coverage is useful.

Due in part to the ability to detect failures of a given subsystem, the safety-critical system 502 can substitute the functionality of properly functioning components for failed components. Additionally, processing units used to implement the safety architecture (e.g., the safety managers 512, 514, 516, 518 and the safety decision making module 520) may be configured with an amount of processing headroom that allows additional computations to be performed. Accordingly, if a processing unit is determined to fail, the operations being performed by the failed unit can be transferred for execution on another processing unit. This allows the safety-critical system 502 to have failed, but still be fully operational—though in a degraded mode in which there is less confidence in the system.

Returning now to the discussion of the environment 200 in accordance with one or more embodiments. The autonomous vehicle 202 is an example of the safety-critical system 502 and the safety decision making module 226 an example of the safety decision making module 520 discussed in FIG. 5. In addition to a safety architecture, the techniques described herein allow component developers to test components for autonomous vehicles with the component testing service 216. In particular, the component testing service 216 may allow component developers to test components for autonomous vehicles without actually incorporating the components into autonomous vehicles and driving in the real world. Instead, the components may be tested over millions of miles in a simulated environment and under a diverse variety of selectable conditions, such as with or without precipitation, in extreme temperatures, in extreme low visibility conditions (e.g., thick fog), and so forth.

To test the AV component 214, the component developer 212 may communicate data indicative of the AV component 214 to the component testing service 216 over a network 228, such as the Internet, to provide a "cloud based" computing environment, in which one or more service providers provide the component testing service 216 to one or more component developers. Service providers are generally configured to make various resources available over the network 228 to users, such as the component developer 212. In some scenarios, users sign up for accounts that are employed to access corresponding resources from a provider. The provider authenticates the credentials for a user (e.g., username and password) before granting access to an account and corresponding resources. Other resources are made freely available, (e.g., without authentication or account-based access). In this case, the resources include the ability to receive data for testing AV components developed by different component developers and communicate data back to the developers to indicate how the AV components performed in various simulations.

In accordance with one or more embodiments, the component testing service 216 includes a processing system (not shown) that includes one or more processing devices (e.g., processors) and one or more computer-readable storage media 230. The illustrated environment 200 also includes auto testing platform 232 that has developer interface 234, simulated driving environment 236, and test results 238 embodied on the computer-readable storage media 230 and operable via the processing system to implement corresponding functionality described herein.

The auto testing platform 232 represents functionality to obtain data that allows AV components to be tested. By way of example, the auto testing platform 232 may obtain the data via the developer interface 234, which may allow developers to upload different algorithms for testing. The auto testing platform 232 also represents functionality to test AV components within the simulated driving environment 236. The simulated driving environment 236 represents miles of real-world roads that can be simulated with a variety of different conditions, such as different temperatures, levels of precipitation, different road conditions (with potholes, made of gravel, loose gravel on asphalt, icy, and so forth), to encounter different scenarios (e.g., each 4-way stop in the United States with varying numbers of cars stopped, pedestrians in city crosswalks, and so on), different times of day, varying weather conditions, and so forth. In particular, the auto testing platform 232 is configured to incorporate the AV components from developers into a virtual autonomous vehicle.

The virtual autonomous vehicle may then be driven through the simulated driving environment 236 in a variety of different simulated scenarios. In other words, the component is tested as part of the virtual autonomous vehicle in scenarios presented in the simulated driving environment 236. During the testing, data indicative of an AV component's performance can be recorded, such as the data the component outputs when a particular situation is encountered, whether the virtual autonomous vehicle abided by the laws, hit other vehicles or people, whether output of the component caused other components to fail, and so forth. This data can be maintained as the test results 238, which can be maintained in storage or communicated to the component developer 212 over the network 228. The test results 238 may be manipulated to generate reports or otherwise report results of test drives to the component developer 212. The component testing service 216 provides AV developers with the advantage of being able to test AV components over hundreds, thousands, or even millions of miles in an afternoon rather than incorporating the components into an actual autonomous vehicle and actually driving all of those miles. Further, this allows a system designer to make minor changes to an algorithm and retest without having to drive an actual test vehicle in the real world.

Figure 6:
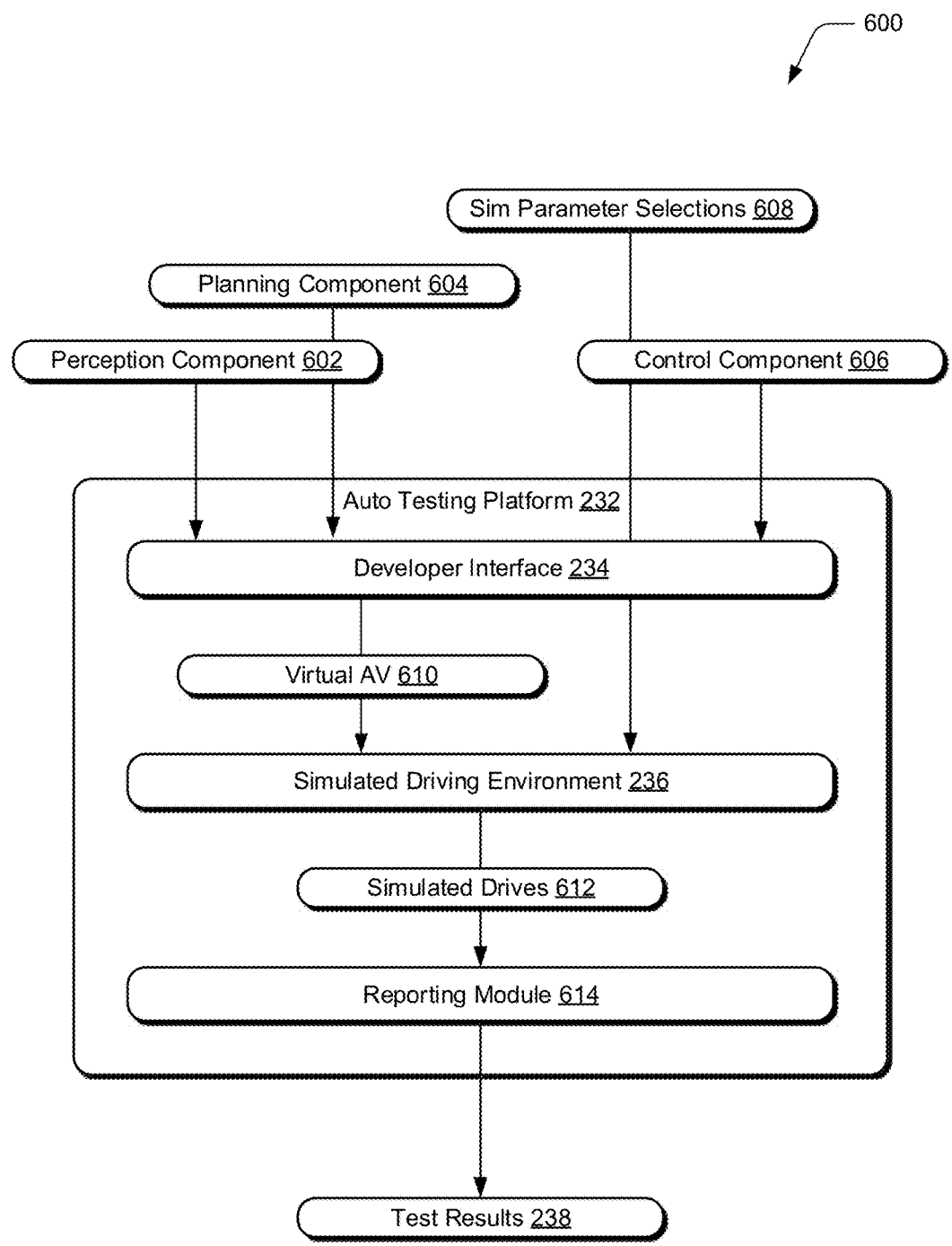
FIG. 6 illustrates an example system in the environment of FIG. 1 for testing autonomous vehicle components in accordance with one or more embodiments.

FIG. 6 illustrates a system in the example environment of FIG. 1 for testing autonomous vehicle components in accordance with one or more embodiments. The example system 600 includes the auto testing platform 232, the developer interface 234, the simulated driving environment 236, and the test results 238. The example system 600 is also illustrated with perception component 602, planning component 604, and control component 606.

The perception component 602, the planning component 604, and the control component 606 represent component data that can be received to test a variety of different autonomous vehicle components. By way of example, the perception component 602 may represent data for a component that processes data from a sensor, e.g., to perceive a condition around an autonomous vehicle. The planning component 604 may represent data for a component that plans routes for an autonomous vehicle, e.g., to accomplish a mission objective such as get from work to home, obey traffic laws, avoid property damage and injury, and so forth. The control component 606 may represent data for a component that controls other components to cause an autonomous vehicle to follow planned routes, e.g., by publishing instructions that indicate an amount to turn wheels of the autonomous vehicle, an amount to accelerate or decelerate, and so forth The component data for implementing the perception component 602, the planning component 604, and the control component 606 may correspond to executable code, an application programming interface, computer-readable instructions, and so forth. This data may be configured to be loaded into dedicated memory of an autonomous vehicle to carry out the corresponding functionality, implementable via dedicated hardware, and so forth. In any case, this component data is communicable over the network 228 to the component testing service 216, for instance, to enable an algorithm corresponding to the perception component 602, the planning component 604, or the control component 606 to be tested. This data may be received via the developer interface 234. The developer interface 234 may include controls that allow a system designer to upload the data to the auto testing platform 232 for testing.

The example system 600 is further illustrated with simulation parameter selections 608 (sim parameter selections 608). Like the perception component 602, the planning component 604, and the control component 606, the sim parameter selections 608 may also be received via the developer interface 234. In accordance with one or more embodiments, the sim parameter selections 608 correspond to selections made by a user (e.g., system designer or developer) to configure the simulated driving environment 236 with specific characteristics for testing. By way of example, a developer may wish to see how a component performs in the rain. Through the developer interface 234, the developer may be able to choose the sim parameter selections 608 so that virtual autonomous vehicle 610 (virtual AV 610) is driven through a variety of different simulated rainy scenarios. The sim parameter selections 608 may be obtained to adjust a variety of different characteristics of the simulation without departing from the spirit or scope of the techniques described herein.

The virtual AV 610 represents an instance of an autonomous vehicle that is capable of being driven in the simulated driving environment 236. The auto testing platform 232 is capable of incorporating components into the virtual AV 610 for testing, such as the perception component 602, the planning component 604, and the control component 606. The virtual AV 610 can also be configured with a variety of predetermined components to simulate functionality of an actual autonomous vehicle. In other words, the predetermined components are configured to generate data and receive data from one another and from test components as if being used in an autonomous vehicle driving in the real world. By way of example, the predetermined components are capable of perceiving conditions in the simulated driving environment 236 (e.g., an upcoming virtual vehicle, an end of a lane, and so forth), planning a route through the simulated driving environment 236 based at least in part on the perceived conditions, and controlling at least some of the predetermined components (e.g., wheel, accelerator, and brake controllers) to cause the virtual AV 610 to follow the planned route. A component being tested can be incorporated anywhere into the virtual AV 610 through addition or by replacing a predetermined component.

The virtual AV 610 may be configured according to the safety architecture discussed above and below. This enables test components to be easily incorporated into the virtual AV 610. For example, incorporating a test component into the virtual AV 610 may include enumerating linked components and instantiating a safety manager for the test component. Incorporation may also involve coupling the test component to the primary virtual bus when the safety architecture is implemented using an out-of-band configuration. In any case, a test component, once incorporated in the virtual AV 610, is capable of interacting with the predetermined components. Test components may interact with the predetermined components during simulated drives 612 through the simulated driving environment 236, for instance.

The simulated drives 612 represent routes that the virtual AV 610 takes through the simulated driving environment 236. For example, one of the simulated drives may correspond to a route in which the virtual AV 610 drives from a first location to a second location in the simulated driving environment 236. The route may pass over virtual roads of the simulated driving environment 236, which are simulated to approximate roads in the real world. In cases where a developer wishes to test a component in off-road scenarios, the route may pass over virtual land of the simulated driving environment 236, which is simulated to approximate land in the real world. Further, the virtual roads and land of the simulated driving environment 236 may be generated to approximate actual roads and land based on collected data that describes the actual roads and land in the real world. In other words, the roads and land of the real world may be recreated in the simulated driving environment 236. The data collected to recreate actual land and roads in the simulated driving environment 236 may be collected by satellite, test cars driving over the roads while recording video of the roads and collecting other data, and so on. The component testing service 216 may collect this data with its own cars and satellites. Alternately or in addition, the component testing service 216 may receive this data from third-party data collectors, such as auto manufacturers, mapping services, global positioning services, land surveying services, and so forth.

In any case, the collected data enables reproduction of real-world roads and land in the simulated driving environment 236, which the virtual AV 610 can drive over in the simulated drives 612. The sim parameter selections 608 allow developers to choose particular sections of land and/or roads over which the virtual AV 610 is to be driven. As noted above, a particular start and end location may be chosen, such as corresponding to particular addresses in the real-world. Alternately or in addition, developers may choose certain types of roads and/or land over which the virtual AV 610 is to be driven, such as single lane highways, roads with potholes, inner-city roads, out-of-use logging roads, desert sand, and so forth. Furthermore, the sim parameter selections 608 allow developers to introduce or remove features from the simulated driving environment 236. For instance, a developer can select to change the weather of the simulated driving environment 236, a number of other vehicles on the road (e.g., heavy traffic, light traffic, no other vehicles), a driving ability of the other vehicles on the road (e.g., can add drunk drivers, drivers who stop their vehicles for seemingly no reason), a time of day, and so forth. A developer can also select to change the conditions of the simulated roads and/or land, such as by selecting to make one or more of the roads freshly paved, have potholes, have an extremely high number (e.g., that is unlikely to exist in the real world) of potholes, and so on. In this way, developers can select to test their components under ideal driving scenarios, normal driving scenarios, in fringe-situational driving scenarios, beyond even the most unlikely scenarios (e.g., to find a breaking point of the component), and so forth.

In the simulated drives 612, a variety of data may be produced by the components of the virtual AV 610 or generated in accordance with conditions encountered in the simulated driving environment. Consider an example, in which the perception component 602 is an algorithm for processing data from a LiDAR system to detect the presence of an object. Since the virtual AV 610 does not detect objects in the real-world using an actual LiDAR system, the auto testing platform 232 may generate data to simulate the data a LiDAR system would produce if exposed in the real world to the conditions in the simulated driving environment 236. The perception component 602 can then receive this simulated data and process it as if it were being used in the autonomous vehicle 202. Such data can be simulated for any of a variety of different components and conditions in connection with the simulated drives 612. For example, the test component may correspond to the control component 606, which in a simulated drive may publish a command instructing wheels of the virtual AV 610 to turn. Based on this command, the virtual AV 610 may turn as instructed in the simulated drive. Other components of the virtual AV 610 may then generate data to indicate new conditions perceived due to the turn and an updated route based on the new perceived conditions. The control component 606 may then publish more commands based on the updated route, such as to continue turning the wheels, turn them the other way, and so forth. The auto testing platform 232 represents functionality to generate a variety of data throughout the perception, route planning, and vehicle controlling phases, in order to simulate a real world driving experience for components being tested.

The example system 600 also includes reporting module 614. The reporting module 614 represents functionality to analyze data representative of the simulated drives 612. Based on the analysis, the reporting module 614 is configured to report on a performance of the virtual AV 610 during the simulated drives 612. In particular, the reporting module 614 is configured to generate the test results 238, which indicate the performance of the virtual AV 610 during the simulated drives 612. The test results 238 are configured to indicate whether the virtual AV 610 obeyed traffic laws during the simulated drives 612, whether the virtual AV 610 was involved in any accidents (causing property destruction and/or injury) during the simulated drives, a measure describing a degree to which the virtual AV 610 obeyed traffic laws (e.g., broke traffic laws once every hundred miles), a measure describing a degree to which the virtual AV 610 was involved in accidents, a severity of the laws broken (e.g., amount the speed limit was exceeded, whether the virtual AV 610 drove through a standing red light), a severity of any accidents, and so on.

The test results 238 are also configured to indicate the performance of a test component during the simulated drives 612. For example, the test results 238 may indicate whether a test component failed and if so a number of failures during the simulated drives 612, a rate at which the test component failed (e.g., once every million miles), scenarios that caused the test component to fail (e.g., driving in certain conditions), data provided to the test component in different scenarios, data output by the test component in different scenarios, and so forth. The test results 238 may also indicate whether a test component passed or failed a given test. For instance, a certifying body may require a component be tested by driving over a predefined length of virtual road having predefined conditions. The certifying body may also require that a test component exhibit less than a threshold failure rate or severity of failures over the predefined drives to pass the test. Passing such a test may indicate that a test component is certifiable by the certifying body.

Furthermore, the reporting module 614 may compute the test results 238 as one or more scores for a test component. These scores may indicate a confidence in the test component over a predefined length of virtual road having predefined conditions. These scores may also be used by certifying bodies to determine whether to certify a test component. For instance, a certifying body may use the scores to certify that a given component is "safe enough" to be used in actual autonomous vehicles on the road. The scores may also enable insurance companies to determine a risk a given component poses for an autonomous vehicle and attach an amount to pay in insurance or amount to reduce an insurance premium based on inclusion of the component. The test results 238 may indicate a variety of different measures and include a variety of different information without departing from the spirit or scope of the techniques described herein.

Having considered an example environment, consider now a discussion of some example details of the techniques for an autonomous vehicle platform and safety architecture in accordance with one or more embodiments.

Autonomous Vehicle Platform and Safety Architecture

In the context of the example environment discussed above, consider the following method, which is shown as a set of blocks that specify operations performed by one or more devices and are not necessarily limited to the orders shown for performing the operations by the respective blocks. In at least some implementations, the method is performed by a suitably configured device, such as the safety-critical system 502 of FIG. 5 that makes use of the safety managers 512, 514, 516, 518, and the safety decision making module 520. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
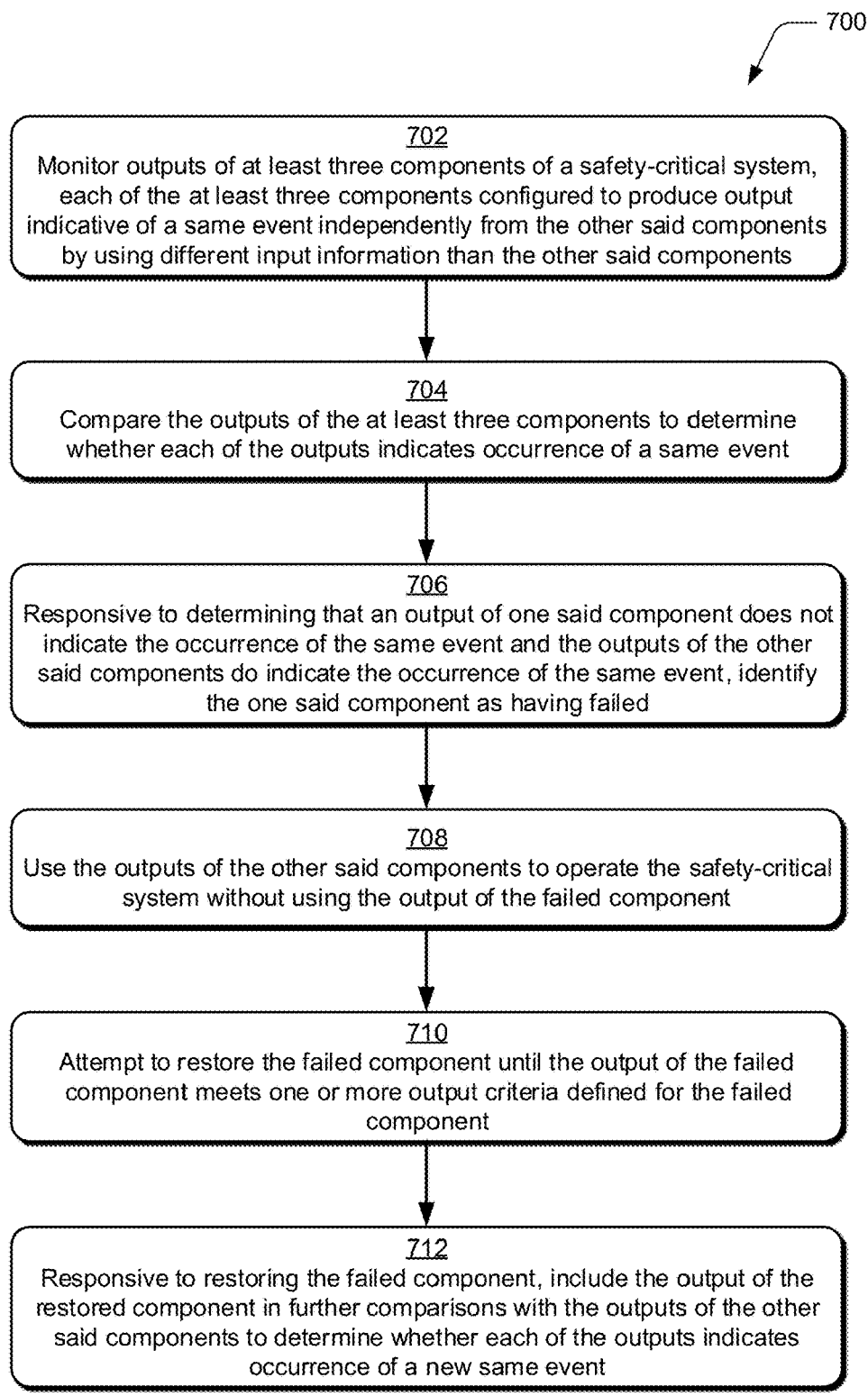
FIG. 7 illustrates an example procedure in which output of linked components is monitored to determine component failures and in which the failure of one of the components is handled according to one or more embodiments.

FIG. 7 illustrates an example procedure 700 in which output of linked components is monitored to determine component failures and in which the failure of one of the components is handled according to one or more embodiments.

Outputs of at least three components of a safety-critical system are monitored (block 702). In accordance with the principles discussed herein, each of these at least three components is configured to produce output indicative of a same event independently from the other said components by using different input information than the other said components. For example, the safety managers 512, 514, 516 and the safety decision making module 520 monitor outputs of the components 504, 506, 508 of the safety-critical system 502. In this example, each of the components 504, 506, 508 is configured to produce output indicative of a same event independently from the other components. The component 504 is configured to produce output indicative of a same event independently from the components 506, 508, for instance, by using different input information than the components 506, 508.

Consider a scenario in which the components 504, 506, 508 correspond, respectively, to a front-facing camera, a LiDAR system, and a RADAR system. Each of these components may be configured to produce output indicative of the same detected objects. However, each of these components does so using different input information, e.g., visible light collected for an image, laser-determined distances, and sound-determined distances.

The outputs of the at least three components are compared to determine whether each of the outputs indicates occurrence of a same event (block 704). For example, the safety managers 512, 514, 516 and the safety decision making module 520 compare messages published by the components 504, 506, 508 via the primary virtual bus 306. The safety managers 512, 514, 516 may obtain such messages through the associations with their respective components 504, 506, 508. In addition to a respective component, the safety managers may obtain the messages of linked components, e.g., components enumerated as producing output for detecting the same events. In this example, the components 504, 506, 508 are linked. Accordingly, the safety manager 512 obtains the messages published by the components 506, 508 in addition to those published by the component 504. The safety managers 514, 516 obtain messages in a similar manner. Further, the safety managers 512, 514, 516 each compare the outputs of the components 504, 506, 508 to determine whether the outputs indicate occurrence of a same event. The occurrence of a same event may be determined with some threshold amount of certainty, such that the outputs may be similar within some threshold tolerance. Continuing with the object detection example discussed above, the safety managers compare the outputs of the respective components to determine whether they each indicate the presence of a particular object.

Responsive determining that an output of one of the components does not indicate the occurrence of the same event and the outputs of the other components do indicate the occurrence of the same event, the one component is identified as having failed (block 706). For example, in the continuing scenario, assume that an output of the components 504, 506 indicates the occurrence of an event (e.g., the presence of an object) and that the output of the component 508 does not indicate the occurrence of the event (e.g., does not indicate the presence of the object). In this scenario, the safety managers 512, 514, 516 determine this discrepancy based on the comparing at block 704. Responsive to determining this discrepancy, the safety managers 512, 514, 516 identify the component 508 as having failed, because the output of the component 508 does not agree with the outputs of the components 504, 506.

The outputs of the other components are used to operate the safety-critical system without using the output of the failed component (block 708). For example, in the continuing scenario, the outputs of the components 504, 506 are used to operate the safety-critical system 502 without using the output of the component 508. In the scenario where the components 504, 506 are object detection components and indicate a detected object (while the output of the component 508 does not), the outputs of the components 504, 506 that indicate the object are used to plan a course of action for the safety-critical system 502. Further, the output of the component 508, which does not indicate the detection of the object, is not used to plan the course of action for the safety-critical system 502. Components that have failed remain in a failed state until the safety managers determine that the failed component or components have been restored to normal operation, which is defined by output criteria specified for the components.

Attempts are made to restore the failed component until the output of the failed component meets output criteria defined for the failed component (block 710). For example, the safety manager 516 attempts to restore the component 508. The safety managers 512, 514, 518, and the safety decision making module 520 may also be involved in restoring the component 508. The safety manager 516 may attempt to restore the component 508 as discussed above, e.g., by resetting the component 508, cleaning the component 508, and so on. Such attempts may be made until the component 508 is determined to be safe, e.g., the output of the component 508 meets criteria specified to define the output. Such criteria may specify a format for the output, a timeliness for the output, and so on. In one or more embodiments, safety managers may cease attempting to restore a failed component, such as after a predetermined number of attempts, a predetermined amount of time, and so on.

Responsive to restoring the failed component, the output of the component is included in further comparisons with the outputs of the other components to determine whether each of the outputs indicates occurrence of a new same event (block 712). For example, assume that the safety manager 516 restores the component 508, e.g., so that the output of the component 508 again meets the criteria specified for output. The safety managers 512, 514, 516 thus again consider the output of the component 508 along with the output of the components 504, 506 for operating the safety-critical system 502. For instance, outputs published by the component 508 can again be compared with the outputs of the components 504, 506 to determine whether the outputs indicate occurrence of a same event, as at block 704.

Having considered an example method, consider further example details of the techniques for an autonomous vehicle platform and safety architecture in accordance with one or more embodiments.

Figure 8:
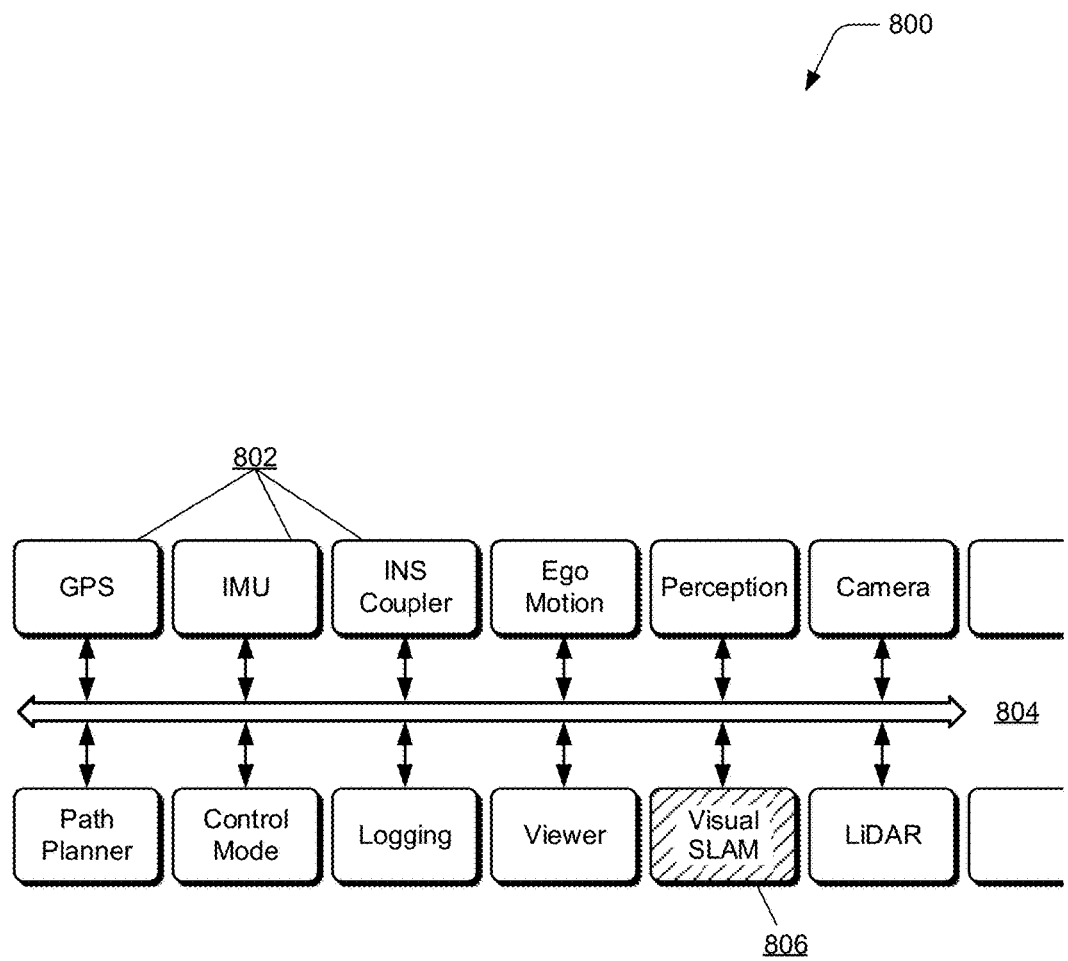
FIG. 8 illustrates an example of a system architecture that implements an autonomous vehicle platform and safety architecture in accordance with one or more embodiments.

FIG. 8 illustrates an example system architecture 800 that can be utilized to implement embodiments of an autonomous vehicle platform and safety architecture, as described herein. In embodiments, the system architecture 800 can be implemented as a publisher-subscriber architecture, in which all applications publish and subscribe to topics that are available to every application (e.g., software applications) on the bus. Additionally, the system architecture 800 can be implemented as a hybrid model that includes the publisher-subscriber architecture, as well as a get-set framework that provides the applications the ability to call for certain parameters and receive them. For example, an application can be queried for its health status or current operating state, and a query response is received back. In addition, an operating state of the application can also be set. The system architecture 800 implements the strengths of the communication modes of both a publisher-subscriber architecture and a get-set framework. For example, some data in the autonomous vehicle platform and safety architecture needs to be sent out as high bandwidth via the publisher-subscriber architecture, such as image data from a camera that is continually streamed. Alternatively, status information may only need to be communicated periodically, such as to indicate a status change or when requested. The get-set framework can be used to analyze and adjust the operational health of the various system nodes, and in the context of reliability and safety, the get-set framework is used to check system node status with settable trouble codes.

In this example, the system architecture 800 incorporates multi-sensor parsing for a multitude of different types of sensors 802, such as vision, radar, LiDAR, IMU, GPS, camera, and any other types of sensors that may be utilized in an autonomous vehicle system. In embodiments, each of the sensors 802 is representative of a sensor or an individual host system that can include computer and/or sensor hardware, as well as the related software and applications implemented for each host that participates (e.g., as a publisher and/or a subscriber) in the PolySync system on the PolySync bus 804, which may be configured as a unified publisher-subscriber and get-set data bus in accordance with one or more embodiments. The system architecture 800 implements synchronization, motion correction, fusion, visualization, logging, and any other types of sensor and data processing.

The system architecture 800 also provides multi-platform support (e.g., Windows™, Linux™, etc.), as well as multi-interface support (e.g., CAN interfaces, TCP/IP, UDP, serial, USB, etc.). The system architecture 800 implements plug-and-play sensors, and a standardized API with abstracted data, such as to swap and/or upgrade sensors as-needed. The system architecture implements feature-rich visualization and a control GUI, as well as provides low-level data fusion, sophisticated filtering, and motion compensation in a fast, efficient, scalable, and embeddable data framework that can be maintained by a single, dedicated support team.

The system architecture 800 implements the autonomous vehicle platform and safety architecture with features collectively referred to herein as PolySync and PolySync Viewer. PolySync can be provided as off-the-shelf middleware for autonomous systems with an easy-to-use API that abstracts low-level system data to high-level data structures. This results in better stability, maintainability, and faster time to market for autonomous vehicle systems than independently developed systems.

PolySync Viewer is a feature set that provides logging and playback, 3D data visualization, system monitoring, configuration, and management for an autonomous vehicle platform and safety architecture. In embodiments, the system architecture 800 of the autonomous vehicle platform and safety architecture can be implemented to utilize a transport protocol such as data distribution service (DDS), which is an open source standard from the Object Management Group (OMG) with a real-time data bus. This architecture minimizes inter-process dependencies to provide a reliable, fault-tolerant, high-bandwidth middleware that is ready for everything from experimental work to mass deployment. DDS provides the system data architecture for the distributed system nodes on the real-time bus. Utilizing the DDS architecture and implementation of the API on top of that architecture is unique, particularly in the automotive and vehicle production industry.

The system architecture 800 that implements PolySync provides multiple layers of reliability, and the system is distributed so that individual nodes can fail without affecting the integrity of the data bus and overall system. For example, an obstruction in the pathway of a vehicle may cause an unexpected failure of the simultaneous localization and mapping (SLAM) algorithm at 806. However, the failure at the one node does not affect the data communications and messaging between the other nodes of the autonomous vehicle platform and safety architecture.

Figure 9:
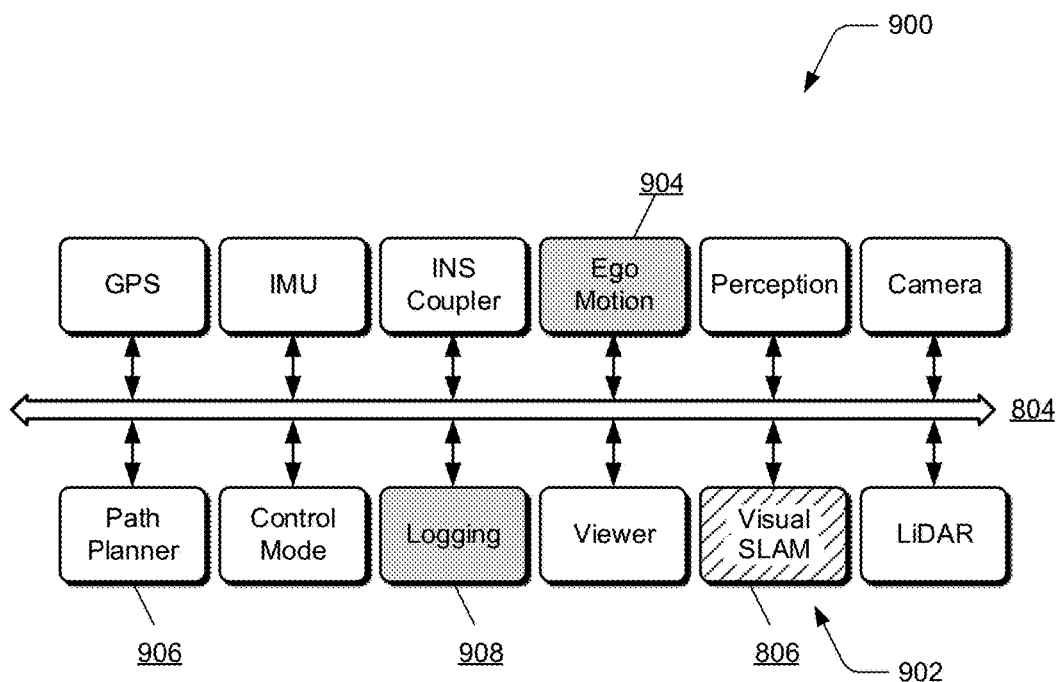
FIG. 9 further illustrates an example of the system architecture that implements an autonomous vehicle platform and safety architecture in accordance with one or more embodiments.

FIG. 9 further illustrates an example 900 of the system architecture 800 that implements embodiments of an autonomous vehicle platform and safety architecture, as shown and described with reference to FIG. 8. This example 900 illustrates that PolySync provides a sophisticated inter-process diagnostic subsystem to monitor errors and change node states to mitigate failures, such as cascading failures that may still occur due to data dependency. A state machine for a fault management and diagnostics system is shown and further described with reference to FIG. 16. Continuing the example of the obstruction in the pathway of the vehicle that causes an unexpected failure of the SLAM algorithm 806 (as shown at 902), the ego motion receives a diagnostic message informing of the SLAM error or failure at 904, and the ego motion changes state to ignore any subsequent SLAM data. The path planner operation is then unaffected at 906 by the SLAM error or failure, and the system errors, such as the SLAM error, are recorded in a "black box" diagnostic logger for later analysis at 908. The sophisticated inter-process diagnostic subsystem to monitor errors and change node states to mitigate failures is further described with reference to the fault management and diagnostics system shown in FIG. 16, as well as generally described herein.

In other examples, an autonomous vehicle may be sent out on a safety-critical mission, such as for a military application or an emergency response, and a communication line is cut when the vehicle is attacked or damaged, runs into a tree or rubble, etc. The autonomous vehicle platform and safety architecture includes the feature of automatic instantaneous multi-pathing to re-route any communications through backup lines. Alternatively, a computer at one of the system architecture nodes (e.g., a sensor node, data processing node, logging node, etc.) may fail. Every computer device on the network and in the architecture system has a complete copy of the system, lying dormant. The system includes an algorithm that will automatically re-distribute the system processing nodes onto the available remaining computers without a central manager, which would itself be a single point of failure. A manager-node architecture illustrates the details of the system architecture, and is shown and further described with reference to FIG. 11. Alternatively or in addition, a central manager may be implemented to perform some or all of the multi-pathing, processing failure recovery, and any of the other described features related to PolySync and PolySync Viewer. In the event that a processing node is no-longer seen or recognized on the bus, the system stops and automatically activates the dormant nodes that are needed. It also redistributes the processing nodes in order to achieve the most balanced load on all available computers.

The overall system architecture 800 that implements embodiments of the autonomous vehicle platform and safety architecture creates system redundancy without having fully redundant hardware, generally referred to herein as adaptive redundancy. In an example, for redundancy of a conventional autonomy system, or generally any network system that includes two individual computer devices, a computer failure would typically require having to deactivate the entire system (both computer devices) and activate different computers of a backup system. In implementations of an autonomous vehicle platform and safety architecture, the same backup effect can be implemented with three or even just two computer devices. In the event of a failure, the algorithm can re-assign the computing tasks (nodes) of the failed computer device onto the appropriate remaining computer devices. This is an example of a self-healing behavior, and although the system may run a bit slower due to an increased load, it keeps functioning and is operable. The same applies to sensor failures as well. If the system architecture includes backup or redundant sensors, they can be activated to replace a failed sensor. Alternatively or in addition, the diagnostic system allows the system architecture to determine whether it can still complete a mission despite the loss of a particular sensor or node.

Figure 10:
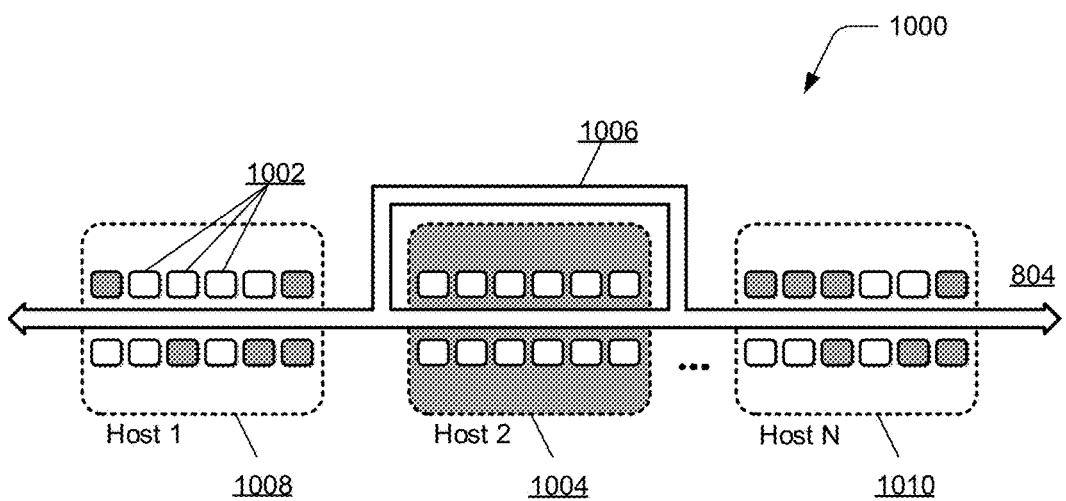
FIG. 10 illustrates an example of redundancy capabilities of the system architecture that implements an autonomous vehicle platform and safety architecture in accordance with one or more embodiments.

FIG. 10 illustrates an example 1000 of the redundancy capabilities of the system architecture 800 that implements embodiments of an autonomous vehicle platform and simulation, as shown and described herein. In this example 1000, a diagnostic subsystem provides software and hardware redundancy by having multiple copies of all of the system nodes that may be distributed onto different hosts (e.g., hosts 1-N) on the PolySync bus 804, where an individual host can include one or more computing devices and/or sensor hardware, as well as the related software and applications 1002 implemented for each host that participates in the PolySync system. Each of the hosts can manage and process multiple applications 1002 that participate on the PolySync bus 804. In the event of hardware damage or failure, dormant nodes can be activated to replace the failed and/or missing nodes. For example, if an automotive electronic control unit (ECU) fails or is damaged (e.g., host 2 at 1004), then network multi-pathing instantaneously (or approximate thereof) switches to a secondary PolySync bus 1006. The ECUs at nodes 1008 (e.g., host 1) and 1010 (e.g., host N) can recognize and/or determine the failure condition and activate dormant backup nodes, allowing operations and/or a mission to continue safely.

Manager-Node Architecture

Figure 11:
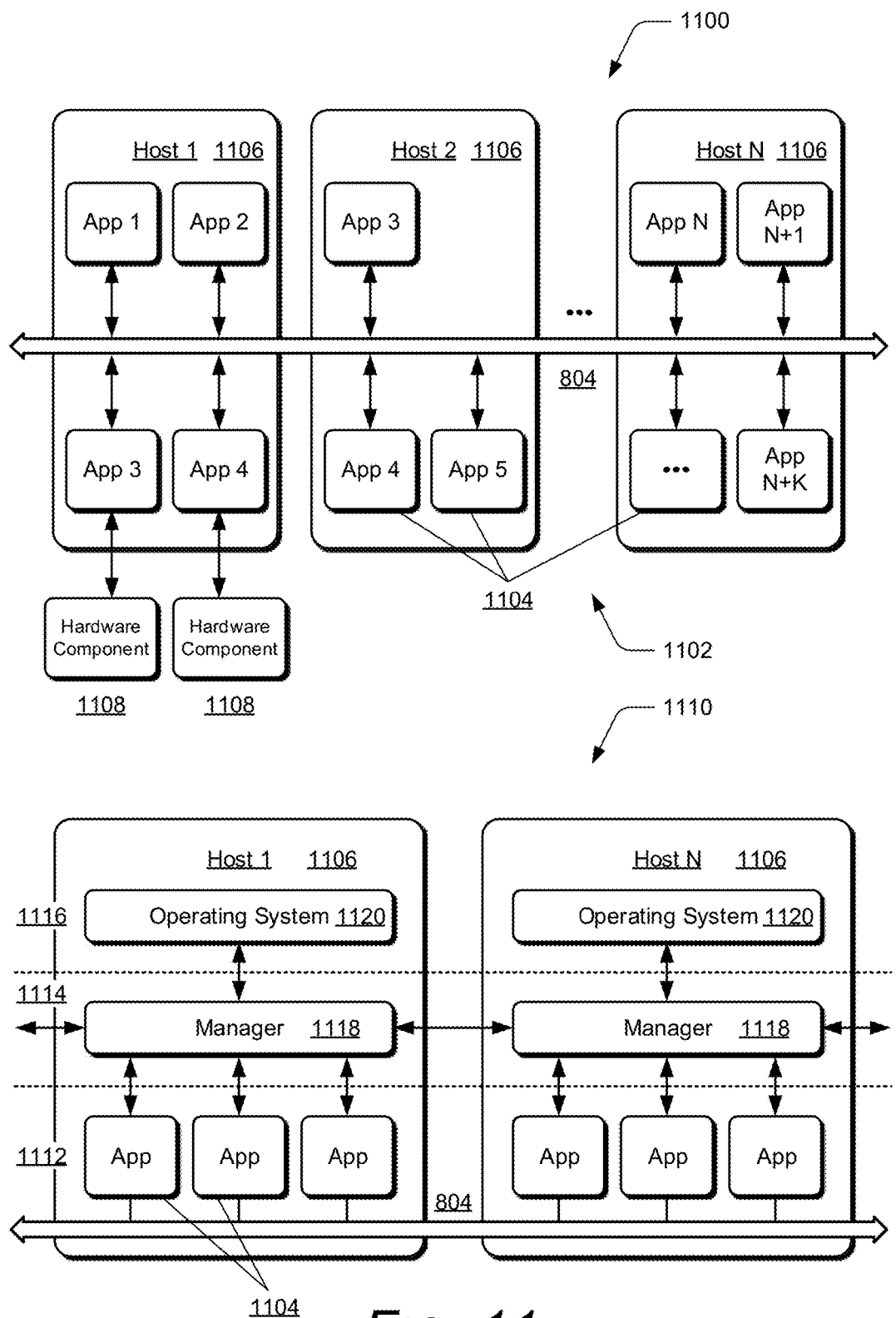
FIG. 11 illustrates an example manager-node architecture within the system that implements an autonomous vehicle platform and safety architecture in accordance with one or more embodiments.

FIG. 11 illustrates an example manager-node architecture 1100, which further illustrates the details of the system architecture 800 that is shown and described with reference to FIG. 8. The manager-node architecture 1100 includes multiple, different "hosts" (e.g., hosts 1-N) on a network represented by the PolySync bus 804 of the system architecture 800. The example manager-node architecture 1100 illustrates a PolySync physical architecture 1102, in which K-applications 1104 (e.g., software applications, components, modules, and the like) are distributed among N-computing devices 1106 (e.g., the hosts 1-N) on a network. The manager-node architecture 1100 also illustrates hardware components 1108, such as sensors, that communicate sensor data to the one or more applications 1104. In implementations, a host 1106 may be a desktop computer, a Linux machine, or other computing device, and the hardware component 1108 can be a GPS and Lidar sensor. Generally, the architecture is scalable, such as where a host 1106 may be representative of the actual GPS unit and the hardware component 1108 is the antenna for the unit. Any number of various combinations of computing devices, hardware, and sensors, as well as the related software and applications are considered.

The example manager-node architecture 1100 also illustrates a PolySync software architecture 1110 that identifies an application layer 1112, a management layer 1114, as well as an operating system and hardware layer 1116. The application layer 1112 encompasses the applications 1104 across all of the hosts 1106 in the network system, and the applications include executable processes that generate, receive, communicate, and/or process data. The manager-node architecture 1100 exposes the management layer 1114, which is implemented and responsible for overall system oversight and interaction with the respective host system. The operating system and hardware layer 1116 interfaces the hardware (e.g., integrated circuits and components) and includes the operating system 1120 for each of the respective hosts 1106.

The manager 1118 of each host 1106 interfaces with the operating system 1120 of the operating system and hardware layer 1116, such as to query system time, request system load status, and networking interface. All of the data communications still take place over the unified publisher-subscriber and get-set data busses (e.g., bus 804), but they are separated into inter-process communications between host managers 1118 and between the applications 1104. A manager 1118 of a host 1106 not only functions as an abstraction layer between the system and an application on the system, but also manages the state of the applications 1104 and which applications are instantiated on a particular host. The managers 1118 in the management layer 1114 communicate with each other to monitor the system as a whole, and each of the managers 1118 know the health (e.g., the operational status) of each of the other managers in the system. If one of the host systems becomes inoperable, then the other host managers in the system can adapt and take over the operational responsibilities of the inoperable system.

Each host manager 1118 of a respective host 1106 is responsible for various tasks that include application management, which involves the instantiation and destruction of other nodes, health monitoring of the applications 1104, and adaptive redundancy. A host manager 1118 is also implemented to manage the synchronization of distributed system clocks, to establish and manage a shared-memory wall clock, and for processing and network load monitoring. The shared-memory wall clock is further described with reference to distributed timing shown in FIG. 19. The host managers 1118 also intercommunicate to share status information with each other for such tasks as automated load balancing and hardware failure compensation, as shown and described with reference to respective FIGS. 12 and 13.

Figure 12:
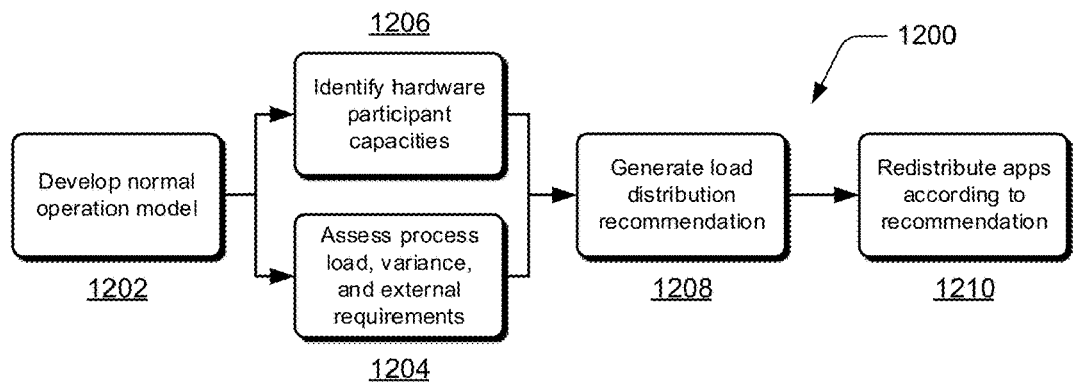
FIGS. 12 and 13 illustrate example algorithms in implementations of the manager-node architecture in accordance with one or more embodiments of an autonomous vehicle platform and safety architecture.

Further example methods are described herein in accordance with one or more aspects of an autonomous vehicle platform and safety architecture. FIG. 12 illustrates an example load balancing algorithm 1200 as implemented by the host managers 1118 of the respective hosts 1106 in the manager-node architecture 1100 described with reference to FIG. 11.

The host managers 1118 communicate and are implemented to work together to move the applications 1104 to machines (e.g., computing devices) that have available capacity. This process is used to optimize hardware utilization and minimize the common "overkill" that comes with non-deterministic software-hardware pairings. The load balancing algorithm 1200 first develops a model 1202 of normal operation of the system as configured a-priori by a user, and may be implemented by use of statistical techniques, genetic algorithms, machine learning, or other techniques to generate the model. The algorithm 1200 then analyzes 1204 each process for overall load and variability over time, as well as determines 1206 any external requirements such as physical hardware availability and capability. Using this information, the algorithm generates 1208 a load distribution recommendation using optimization techniques, with the goal of minimizing load across all host participants. The processes on the various hosts 1106 can be moved from one host to another, and are all run-time instantiations in the system.

Finally, the host managers 1118 take action based on the algorithm to redistribute 1210 the application layer 1112 as necessary to achieve the recommended configuration. For example, the state of an application can be suspended and shut down, and then re-instantiated on another host. In embodiments, dynamic drivers are implemented to generate (e.g., spawn) applications as opposed to building a static application, or instantiating a static application. The system actually spawns off the dynamic drivers to instantiate an application while the host is processing. Because it is actually a run-time instantiation of an application, an unlimited number of applications and dynamic drivers can be generated as-needed and where needed, which facilitates the load balancing. Because there is no software that is inherently tied to a particular host machine, the applications can all be implemented as run-time instantiations. The load balancing algorithm 1200 may also generate a hardware utilization metric that indicates the capacity to which the processing hardware on the system is being under or over utilized. This information can be useful in determining the lowest-cost of hardware necessary for a system to operate properly.

Figure 13:
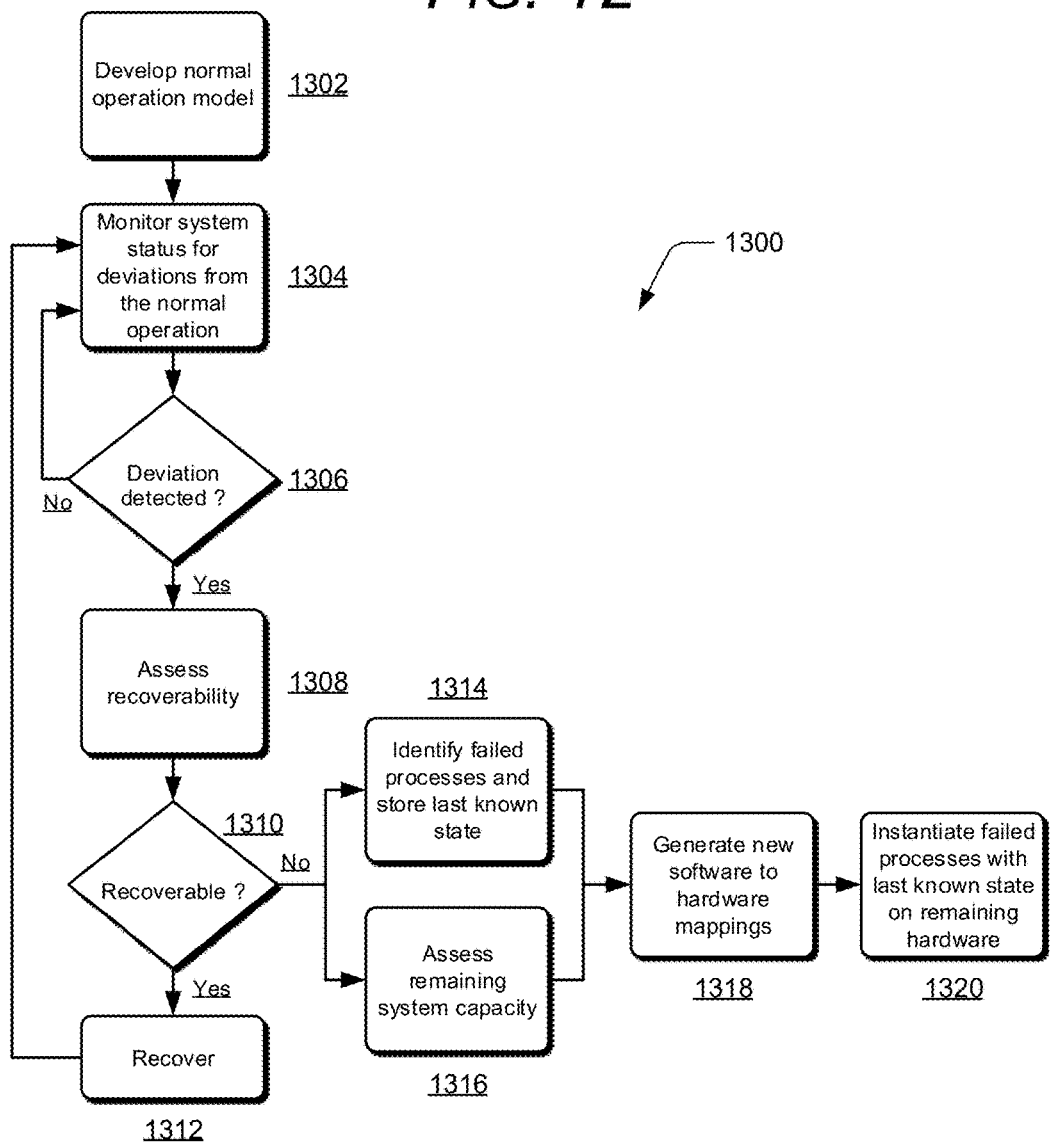

FIG. 13 illustrates an example adaptive redundancy algorithm 1300 for hardware and/or software failure compensation as implemented by the host managers 1118 of the respective hosts 1106 in the manager-node architecture 1100 described with reference to FIG. 11. Utilizing the same algorithm method as described with reference to FIG. 12 for load balancing, the host managers 1118 can respond to system failures by redistributing the applications 1104 to remaining operational systems, thus implementing an adaptive redundancy of the system. In this example, the normal operation model 1302 includes watchdog-type messaging (also commonly referred to as heartbeat device messages) with frequency expectations so that normal operation of the host managers 1118 and the applications 1104 is known. Accordingly, the algorithm monitors 1304 the system status for deviations from the normal operation. This capability can be used for any fatal hardware or software failure, which is a critical capability for autonomous vehicle systems where there is often no fail safe state, in which case systems must fail operational. The algorithm 1300 monitors to detect 1306 deviations, and assess 1308 the recoverability of a hardware or software failure.

If a hardware or software failure is determined 1310 to be recoverable, then the host managers 1118 implement to recover 1312 the hardware or software failure, and the algorithm continues to monitor 1304 the system status. In implementations, an application may be able to self-recover or a host manager 1118 may be able to initiate a recovery of the application, such as to terminate the process and restart it, terminate a different process and restart it, send a reset command to a sensor, and/or any other type of recovery process. However, if the hardware or software failure is determined 1310 not to be recoverable, then the algorithm 1300 identifies 1314 the failed processes and stores the last known state, as well as assess 1316 the remaining system capacity.

In the case of a non-recoverable failure, something at the system level has failed and is not likely fit to run processes, particularly in the context of an autonomous vehicle. Generally, a data fusion algorithm (e.g., as further described below) can be utilized to determine whether a host 1106 still has enough reliable data to remain an active host on the PolySync bus and operate safely, such as if one sensor has failed and is no longer providing data, but a consensus view can still be established based on the remaining sensor inputs. Based on the adaptive redundancy algorithm 1300, the host managers 1118 generate 1318 new software to hardware mappings, and instantiate 1320 the failed processes with the last known state on the remaining operational hardware of the system.

Brain Concept Architecture

Figure 14:
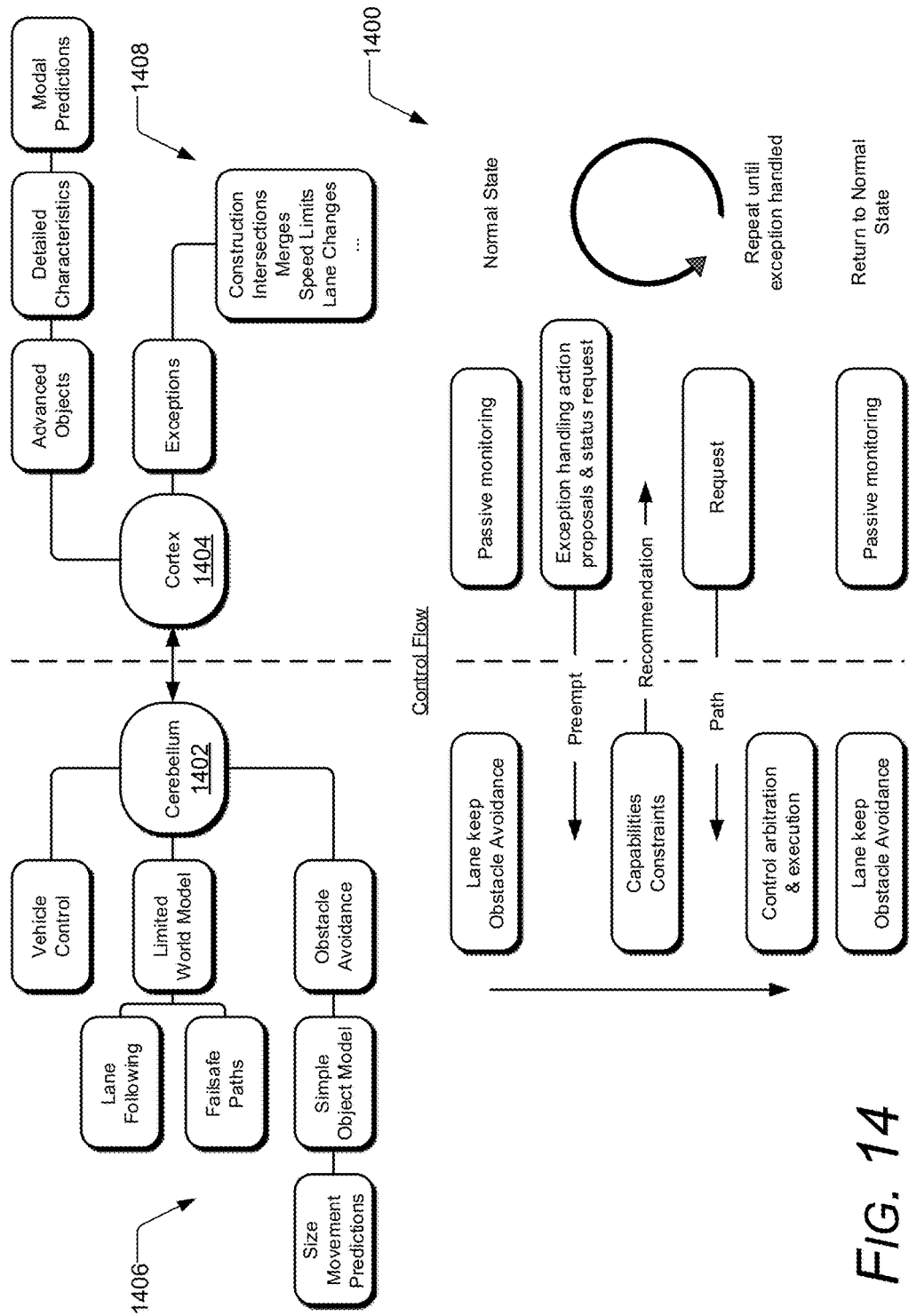
FIGS. 14 and 15 illustrate an example concept architecture for an autonomous vehicle platform and safety architecture in accordance with one or more embodiments.

FIG. 14 illustrates an example concept architecture 1400 for the autonomous vehicle platform and safety architecture described herein, and illustrates a brain concept architecture that, on a high-level, generally reflects the autonomous vehicle platform and safety architecture. The assumption of having a safety problem in conventional automotive systems is based on the assumption that the systems can always fail back to a "safe state", and intelligent safety systems are designed to fail and return control to the driver. However, as these systems become more advanced, taking over more of the vehicle control, drivers may disengage (e.g., "tune-out") from their environment and become incapable of resuming control of the vehicle, particularly in a driving situation that requires a quick response. In full autonomous driving systems, the driver may not have access to the vehicle controls at all, and in these systems, there may not be a failsafe state for the system to fail back on.

The concept architecture 1400 is generally thought of in terms of brain functions, where cognition and control capabilities are split into two independent, but inter-functioning subsystems anecdotally called the "cerebellum" 1402 and the "cortex" 1404. These terms are chosen merely for illustrative discussion and indicate a focus on higher and lower order perceptual responsibilities as related to the autonomous vehicle platform and safety architecture, but do not necessarily correspond to or imply the responsibilities of biological brains. In embodiments, the autonomous vehicle platform and safety architecture is designed to fail operational, rather than just "fail safe" because there may not always be a safe state for the system to fail back on.

The cerebellum 1402 is responsible for short-term actions that require only limited planning and knowledge of the environment. In an automated vehicle, these are primarily lane following and obstacle avoidance. The cerebellum 1402 focuses on the low-level, fairly inflexible operations in the real-World driving experience. It is also responsible for interacting with the vehicle chassis controls (e.g., throttle, brake, steering, shifting, wipers, turn signals, etc.), arbitrating and executing control requests from the general cerebellum system 1406, those of the driver, and/or those of the cortex system 1408.

The cortex 1404 is responsible for higher-level perception and planning, and focuses on the high-level "thinking" tasks. It creates a much more detailed representation of the world, including advanced objects such as pedestrians, bicycles, cars, etc., and can predict the behaviors of such objects for future path planning and avoidance. Generally, the high-computing, high-sensing cortex 1404 is responsible for the more advanced functionalities, such as high-level path planning, mapping, change detection, advanced vision, and the like. This cortex system 1408 can be implemented to include the advanced computing cores and the advanced sensors that may be redundant with similar components of the cerebellum system 1406 for data verification, for instance. Essentially the cortex 1404 (e.g., the high brain) initiates requests to the cerebellum 1402 to deviate from a normal operation mode (e.g., lane keep and object avoidance) because the cerebellum is the gateway to actually controlling a deviation operation, such as changing lanes, traveling through an intersection or construction zone, or other type of deviation from a normal mode.

With reference to the autonomous vehicle platform and safety architecture, the advanced cortex-level processing can completely shut down or break, and the cerebellum 1402 will still operate a vehicle safely. The important feature is to fail in an operationally safe state, which is to maintain the vehicle lane and avoid obstacles, and then attempt to follow a safe path to stop the vehicle. In implementations, the cerebellum aspect of the autonomous vehicle platform and safety architecture is a fail operational state. In a failsafe path, the vehicle should have visibility beyond its stopping distance and have a map available, such as to identify intersections so as not to travel through an intersection without stopping. Accordingly, a model implementation of the cerebellum 1402 in the autonomous vehicle architecture will handle the various tasks of lane following, obstacle avoidance, generating failsafe paths, and handling vehicle interactions for a fail operational sub system.

Figure 15:
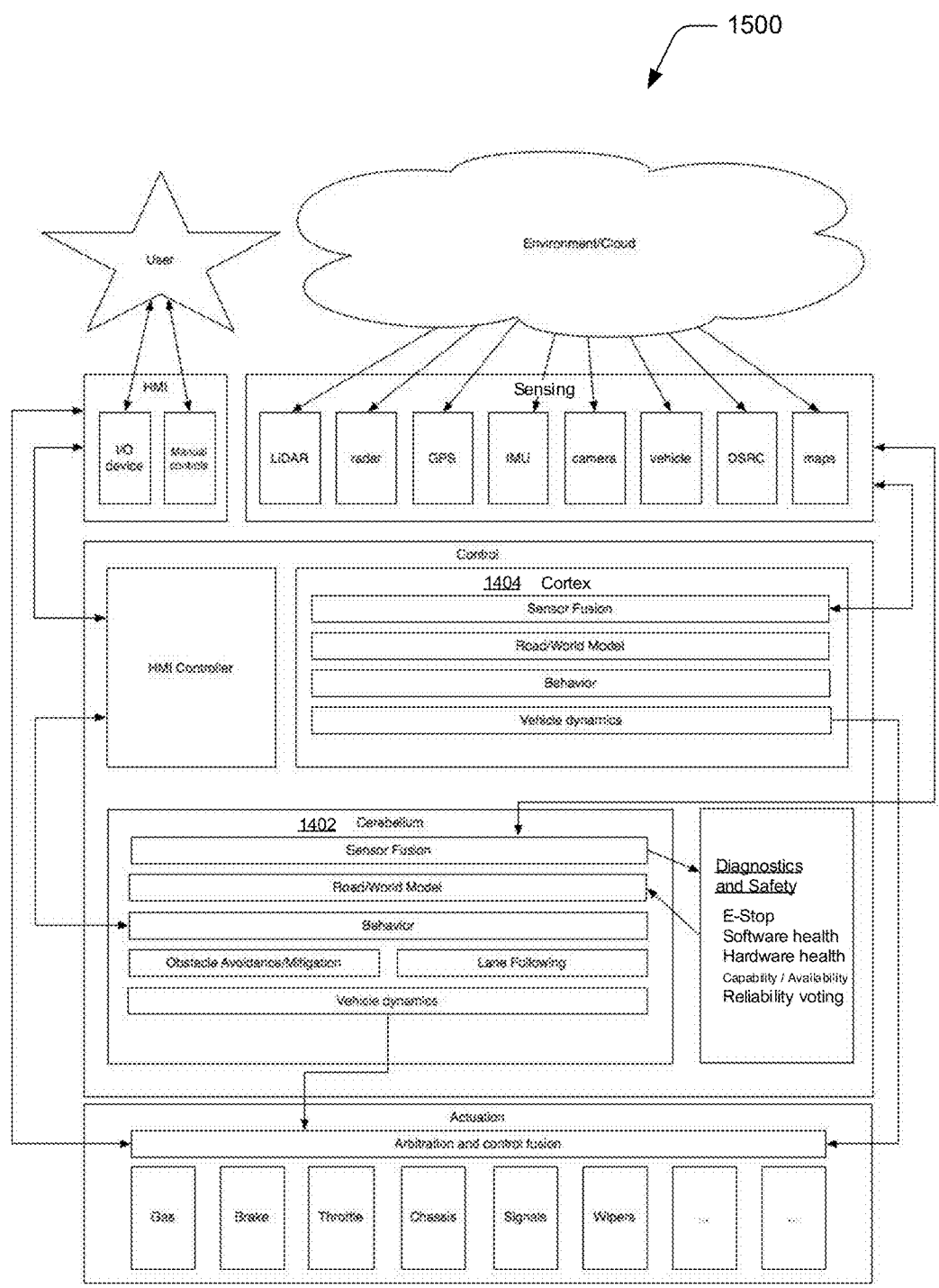

FIG. 15 further illustrates the example concept architecture 1400 described with reference to FIG. 14 for the autonomous vehicle platform and safety architecture described herein, and illustrates an integration of a high-level brain architecture 1500 in the overall system architecture. Generally, the cerebellum 1402 would keep an autonomous vehicle following at a safe distance behind the car ahead and steering within the lines of the lane. The cerebellum 1402 can determine out how to make a pass, yet if the passing operation fails, the cortex 1404 will know how to achieve a safe operational state by resuming the original mission (e.g., safe following staying between the lines). In another example, if the vehicle encounters a patch of ice during the passing operation, the cortex 1404 takes over and regains control of the skid. Fundamentally, most of driving a vehicle (by a person) is avoiding objects and lane following or keeping within the lines, or in the case of undeveloped roads, keeping the vehicle on the right-hand side of the road and staying within the designated travel corridor. A driver is generally not performing advanced object processing to avoid objects and travel within a designated lane, and a driver has a really good understanding of the vehicle dynamics, such as not to skid around on ice or to know how hard to take a corner. A lot about driving is the experience, the feeling. A driver feels his car as he is traveling along, but doesn't necessarily think about all of the driving fundamentals to maintain general vehicle operation and control in a limited World experience.

Fault Management and Diagnostics System

Figure 16:
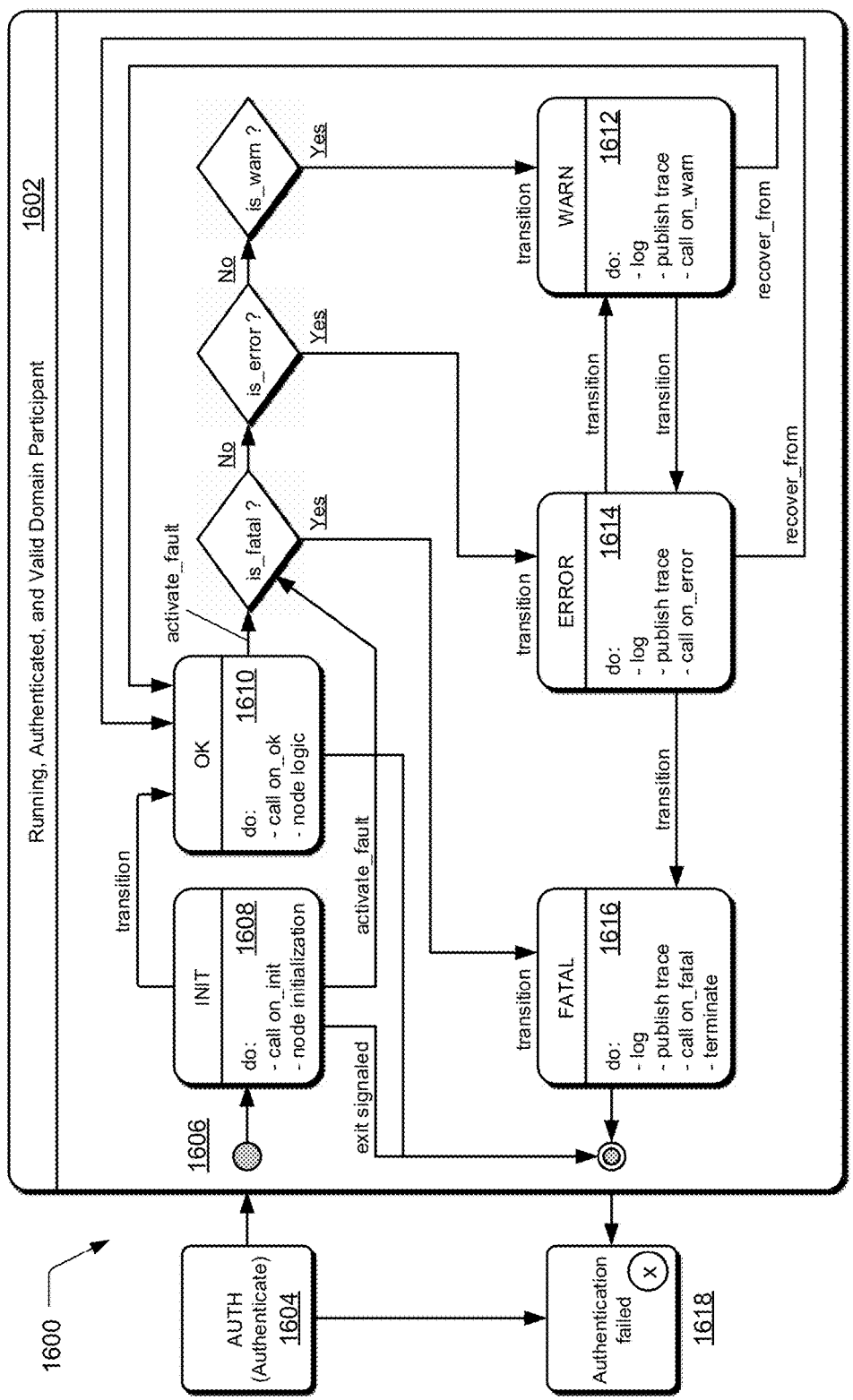
FIG. 16 illustrates an example state machine for a fault management and diagnostics system that can be implemented in the manager-node architecture in embodiments of the autonomous vehicle platform and safety architecture.

FIG. 16 illustrates a state machine 1600 for a fault management and diagnostics system that can be implemented as part of the manager-node architecture in embodiments of the autonomous vehicle platform and safety architecture. Autonomous vehicles operate with a high degree of complexity and interdependency that makes them susceptible to fatal or cascading failures. For safety, a deterministic state model of applications is generalized that allows actively handling faults before they can become failures. The state machine 1600 is described for a running, authenticated, and valid domain participant 1602, such as an individual node and/or application. The state machine defines the node states and transitions into the states that gives an application the ability to intervene in a fault condition, report the condition, attempt to recover, and otherwise enter a "failsafe" state.

A variety of methodologies can be utilized to detect fault conditions, including statistical comparisons, voting, as well as machine learning, genetic algorithms, etc. Fault reporting can be implemented in the form of Diagnostic Trouble Codes (DTCs) and recovery actions are reported with Mitigation and Recovery Codes (MRCs), which are a set of static conditional definitions represented by integers. Recovery methodologies can be implemented by a programmer and are system or application dependent, and may require a failsafe or fail operational default state depending on the safety criticality of the process.

A "failure" occurs when an observed behavior differs from the expected behavior (noting that the reference is the expected behavior, not the specification, since even the spec could be false). An "error" is the part of the system state that may lead to a failure, and a "fault" is the cause of an error, where a software fault occurs in the software as an information fault that affects software, programs, or data, and a hardware fault occurs in the hardware as a physical fault that originates in, or affects, the hardware. Generally, faults are handled so as not to lead to cascading errors and/or so that they are traceable. A fault can be detected in various ways implemented in the system, where a fault condition is reported, an attempt is made to recover from the fault, or otherwise enter a failsafe state or a fail operational state. The system includes a template so that the programmers can define these as standard operating states in all of the nodes, and then a general operating state of all nodes on the bus that use this definition is known.

A node can include any one of various states after fault activation. An authenticate state AUTH 1604 indicates that a node is currently being authenticated, does not have a GUID, and is not an active domain participant. The node can be instantiated at 1606 by psync_init( ) and then permitted on the PolySync bus when authenticated. An initialization state INIT 1608 indicates that the node is initializing, has a GUID, and is a domain participant. An operational state OK 1610 indicates that the node is running as a domain participant. A warning state WARN 1612 is a fault set of the node that indicates a fault may lead to a failure, can continue, can recover, and auto-recovery is typically handled by code. An error state ERROR 1614 is a fault set of the node that indicates failure will occur, fault is fatal to the operation but not the application, and user-intervention is typically required to recover. A fatal state FATAL 1616 is a fault set that indicates failure will occur, fault is fatal to the application, not recoverable, and the application may terminate to prevent data loss (or further data loss). Authentication of the node may also fail at 1618. The goal for a particular node is to define behaviors for all possible faults, and to recover when appropriate. An API (application programming interface) can be utilized to facilitate these with callbacks, nodes define the code, the API decides when to call, and can be triggered by many different faults.

Domains Architecture

Figure 17:
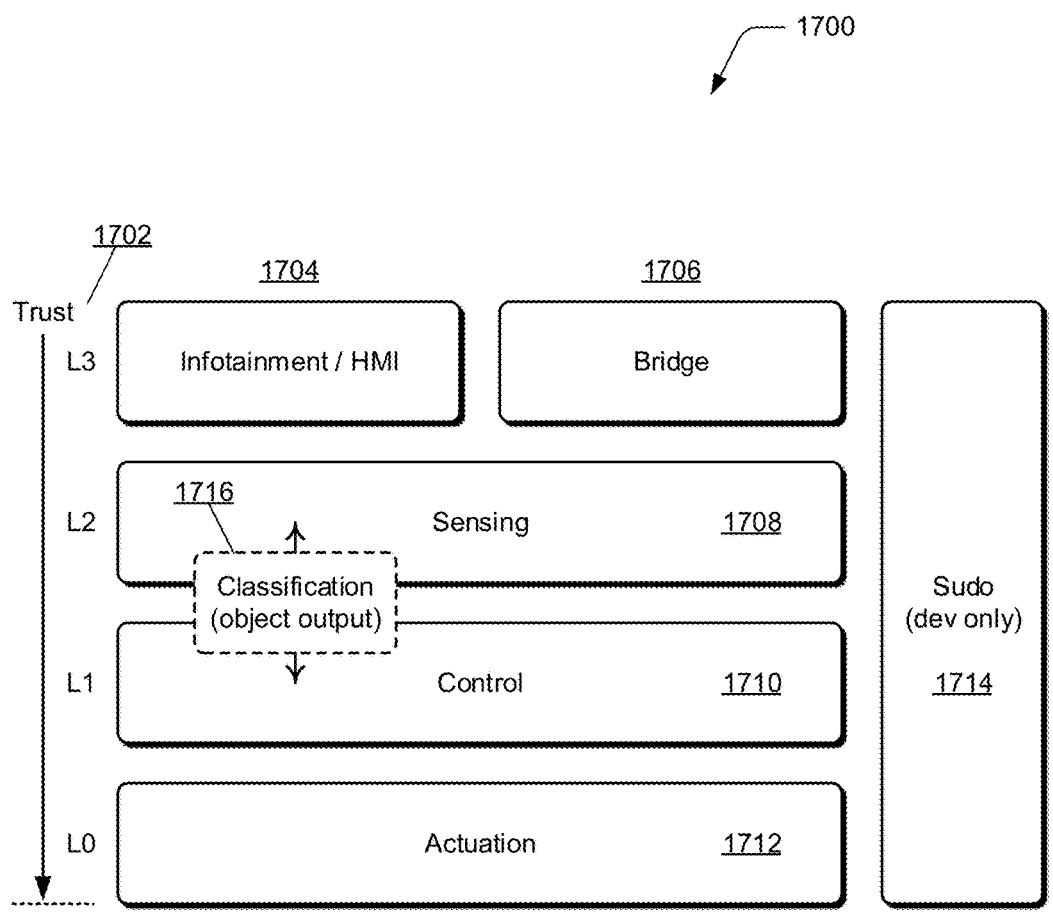
FIG. 17 illustrates an example domains architecture that can be implemented in the manager-node architecture in embodiments of the autonomous vehicle platform and safety architecture.

FIG. 17 illustrates a domains architecture 1700 that can be implemented as part of the manager-node architecture in embodiments of the autonomous vehicle platform and safety architecture. Highly automated vehicles must implement robust and secure mechanisms to prevent malicious activity. Because these systems are computerized, they are susceptible to a broad spectrum of well-developed attack methods. In embodiments of the autonomous vehicle platform and safety architecture, PolySync implements application domains having trust levels 1702 that are established with respect to safety responsibilities of the hardware and software components. The domains are analogous to permissions levels, where the applications in an application level only communicate with the other applications in their particular domain. The domain trust levels 1702 may correspond to a level of a-priori knowledge, authentication procedures, frequency of re-authentication, or other security verification techniques. Some applications can be members of multiple domains, which controls inter-domain communication with specific gateway applications. This facilitates a communication security function, which applies to safety of the autonomous vehicle platform and safety architecture in the presence of malicious activity. The domains also isolate critical processes from each other and from the potential malicious activity.

In this example, the domains architecture 1700 implements a level three (L3) trust level that includes infotainment 1704 for onboard entertainment and driver information systems, and includes a bridge 1706 for external communication dynamic drivers, such as for Bluetooth™, Wi-Fi, and DSRC. The domains architecture 1700 also implements a level two (L2) trust level that includes sensing features 1708 for onboard sensing dynamic drivers (e.g., LIDAR, radar, GPS, inertial, camera, CAN, etc.) and sensing applications (e.g., fusion, classification, terrain characterization, etc.). The domains architecture 1700 also implements a level one (L1) trust level that includes control features 1710 for the higher-level applications with chassis control access (e.g., for high and low-level path planning). The domains architecture 1700 also implements a level zero (L0) trust level that includes actuation features for chassis actuation dynamic drivers, such as for by-wire control interfaces. The domains architecture 1700 also implements a sudo feature 1714 as root access for experimental and development use.

In a communication security implementation, applications within each domain have varying degrees of security associated with them, and the security levels protect against acts, where higher security systems typically have fewer ways to access them and higher restrictions on the access. For example, the access to the level zero (L0) domain for actuation 1712 has very restricted access as to which applications can actually control vehicle actuators, such as to provide vehicle steering and other control inputs. An application that would have access to initiate actuation controls at the level zero (L0) trust level would also have access at the level one (L1) trust level in the control domain, and is implemented for gateway communications between the domains. An application that bridges domain levels at 1716 can not only check that received data comes from a reliable source before passing it into a higher level of trusted domain, but can also determine whether the input is situationally valid as an autonomous vehicle input at the point when the data is received. In context of the manager-node architecture 1100 described with reference to FIG. 11, each of the various applications 1104 that are distributed among the hosts 1106 are assigned to at least one of the domains in the domains architecture 1700.

Shared Memory and Distributed Timing System

Figure 18:
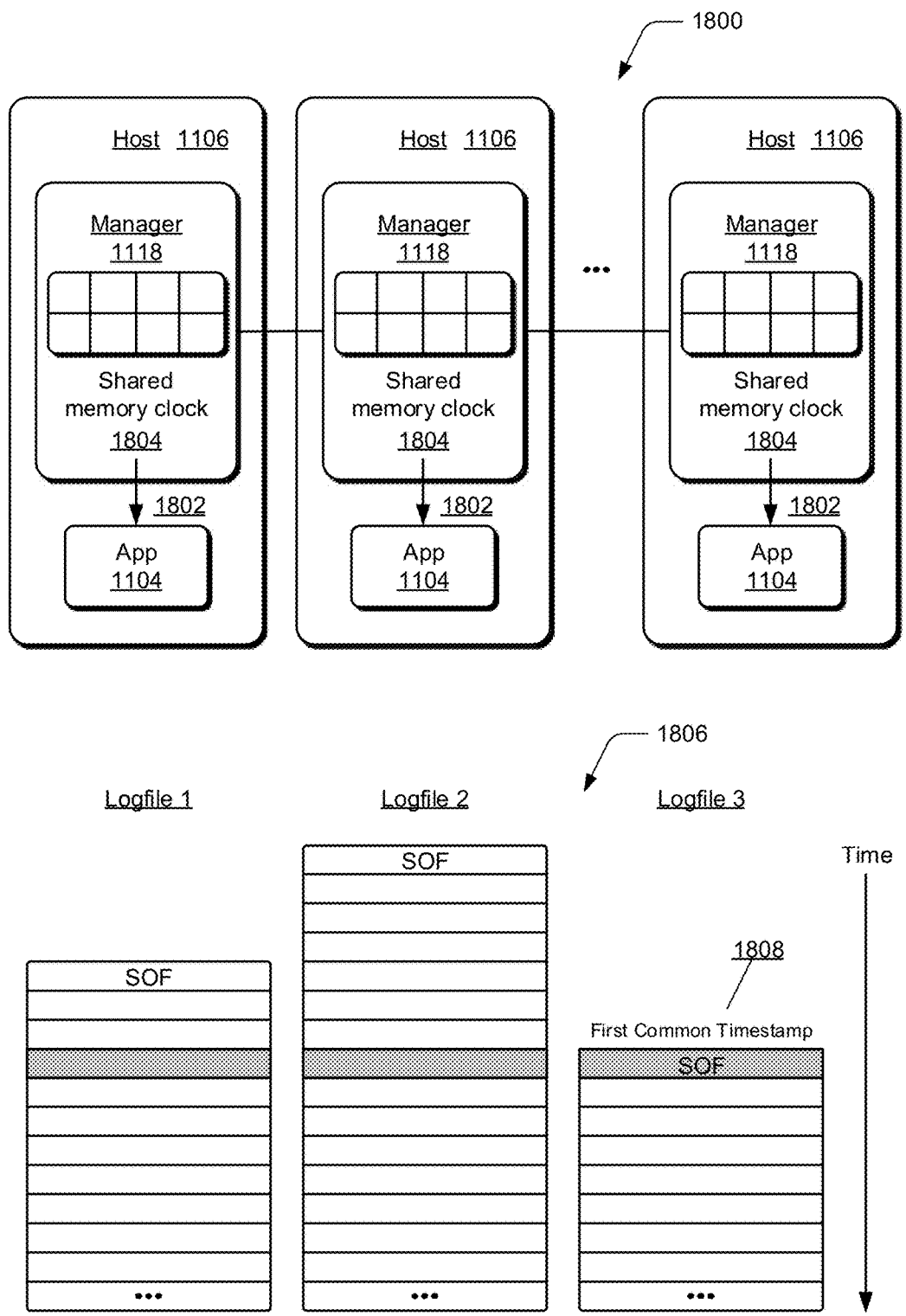
FIG. 18 illustrates an example shared memory and distributed timing system that can be implemented in the manager-node architecture in embodiments of the autonomous vehicle platform and safety architecture.

FIG. 18 illustrates a shared memory and distributed timing system 1800 that can be implemented as part of the manager-node architecture 1100 described with reference to FIG. 11 in embodiments of the autonomous vehicle platform and safety architecture. The PolySync system is a distributed system that may contain an unlimited number of the hosts 1106 with the applications 1104 (e.g., "apps" or "nodes") running on them (as described above with reference to FIG. 11). Many operations of these applications 1104 require precise timing that is accurately synchronized with other participants on the network (e.g., the PolySync bus). This presents a challenge because many non-deterministic functions are required for inter-process communications, and there may be a lag in the communications between participants so they can't practically broadcast their internal clocks on the network directly.

However, in embodiments of autonomous vehicle platform and safety architecture, local clocks are created that are synchronized continuously among the managers 1118 of the hosts 1106 in the management layer 1114, and the hosts are therefore able to broadcast a clock signal 1802 to the applications 1104 on a respective host with minimal lag. The challenge here is to create an accurate shared clock that scales linearly with the number of the hosts 1106 instead of the applications. In the management layer 1114, the hosts 1106 are communicatively linked together for a shared memory clock 1804 that can be broadcast to all of the applications 1104. Further, the shared memory clock 1804 is accessible by all of the applications 1104 on a respective host 1106 in shared memory for fast data access.

Another challenge for distributed systems is synchronizing start and stop of log file replay. Despite accurate timing across the network, the log start time for each node (e.g., at the hosts 1106) will have some variability that will manifest as poor synchronization if using the start of file (SOF) to align the files. However, in embodiments of an autonomous vehicle platform and safety architecture, a set of log files 1806 to be replayed are analyzed to determine the "first common timestamp" 1808, which is typically the first entry of the latest SOF. The shared global conditional variable can then be shared to broadcast a start time and the tick count at which to start playback of the log files.

Figure 19:
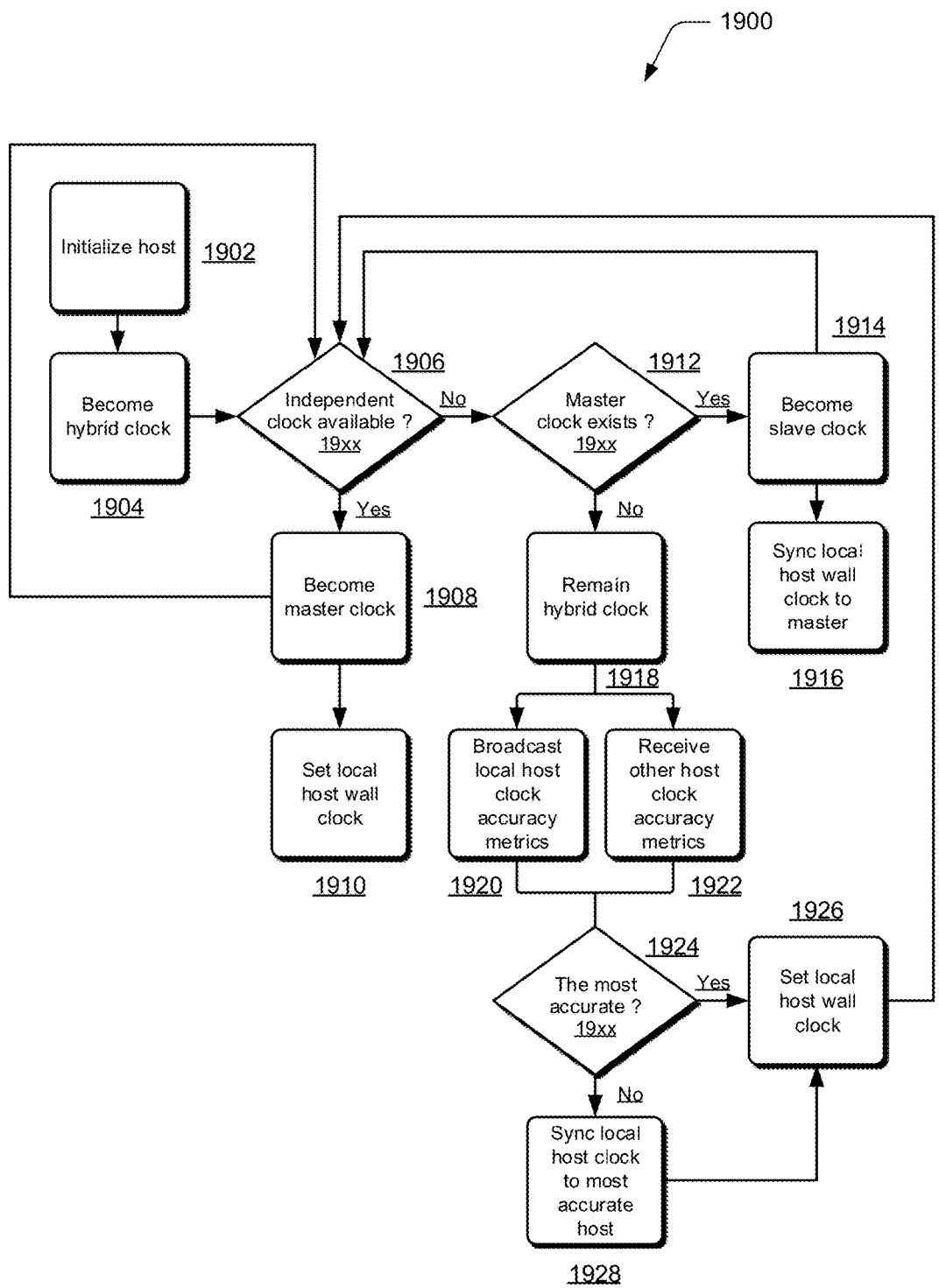
FIG. 19 illustrates an example distributed timing algorithm for setting a local host clock to a synchronized global time in embodiments of an autonomous vehicle platform and safety architecture.

FIG. 19 illustrates an example distributed timing algorithm 1900 for setting a local host clock to a synchronized global time in embodiments of an autonomous vehicle platform and safety architecture. A host 1106 is initialized 1902 and the host clock is set to hybrid mode to become the hybrid clock 1904, where the clock can act as a master or slave clock depending on the behavior of the other hosts 1106 on the network. A determination 1906 is then made as to whether there is an independent source of timing available, such as GPS or scientific clock sources. If an independent clock source is available, then the host (e.g., initialized at 1902) becomes 1908 a master of the clock and causes all of the other hosts to become slaves to the clock, and the local host wall clock is set 1910.

If an independent clock source is not available, then a determination 1912 is made as to whether a master clock already exists, and if not, the initialized host becomes 1914 a slave clock and syncs 1916 the local host clock to the master clock. Alternatively, if the host clock remains 1918 a hybrid clock in the hybrid mode, all of the other hybrids on the network cooperate to determine the most accurate clock on a continuous basis. This is accomplished by broadcasting 1920 local host clock accuracy metrics and receiving 1922 other host clock accuracy metrics. A determination 1924 is then made as to whether the hybrid clock is the most accurate, and if it is, the shared memory "wall clock" in the local manager is set 1926 to the local host clock. If the hybrid clock is not the most accurate, then synchronize 1928 the local host clock the most accurate host, and again, the local manager is set 1926 to the local host clock.

The wall clock broadcasts a POSIX signal which controls a shared conditional, which is available in the shared memory. Applications can subscribe to this shared broadcast via the shared memory, which gives them access to a synchronized global clock tick and other shared resources. The wall clock entity in memory includes an interrupt ticker and a global conditional variable that can be used to synchronize processes to an absolute point in time. This is very useful for synchronizing operations across all machines (e.g., the hosts 1-N) on the network, such as starting and stopping, and recording or replay of log files. The shared memory has an interrupt timer (or interrupt ticker) that sends out ticks counting up at a known time. For example, every ten milliseconds it sends out an interrupt to all of the applications on a host, and also sends out the global conditional variable that can be used for synchronizing.

PolySync System and Viewer

Figure 20:
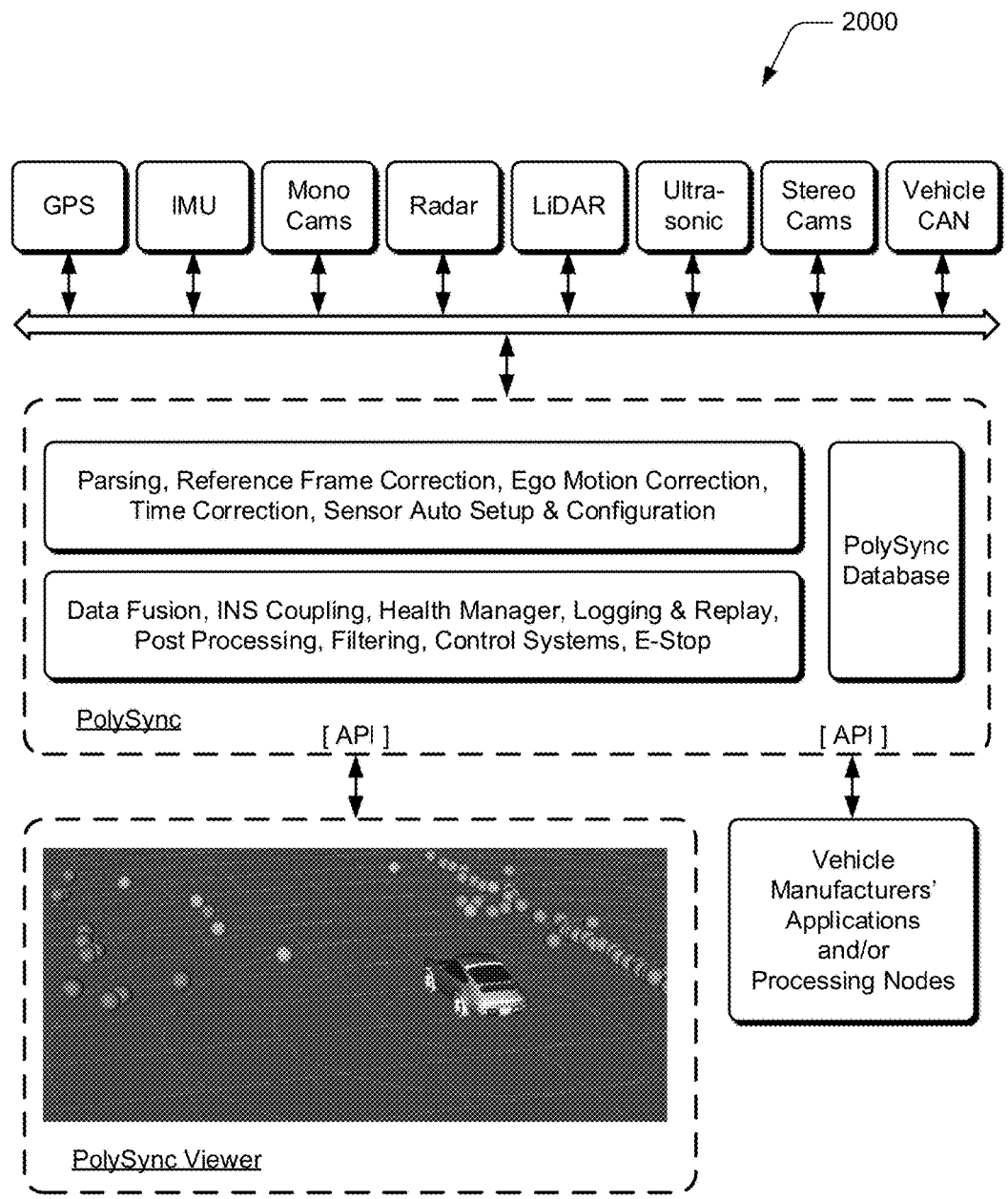
FIGS. 20-23 illustrate examples of features of the system architecture that implements an autonomous vehicle platform and safety architecture in accordance with one or more embodiments.
Figure 21:
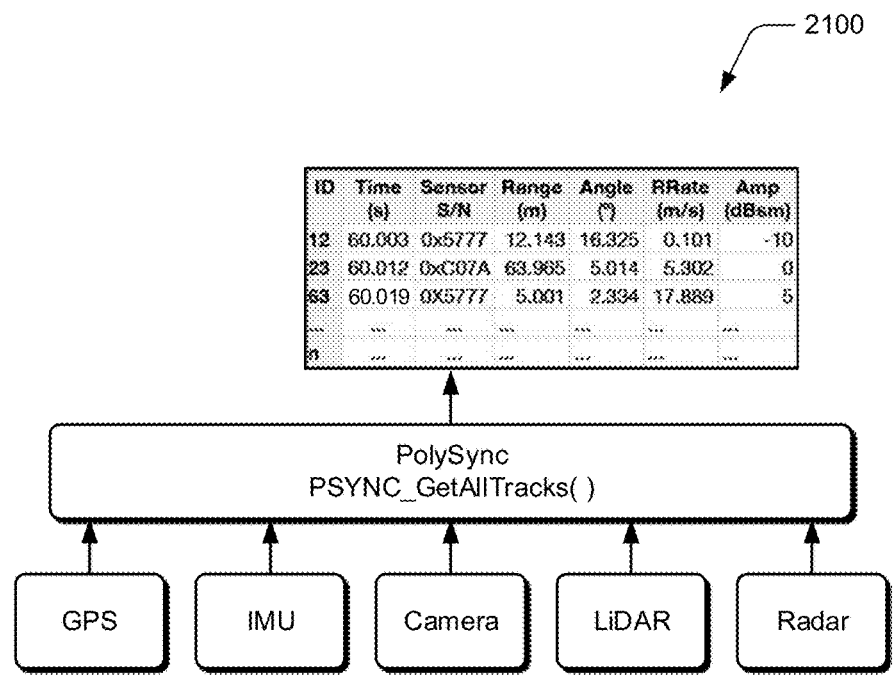
Figure 22:
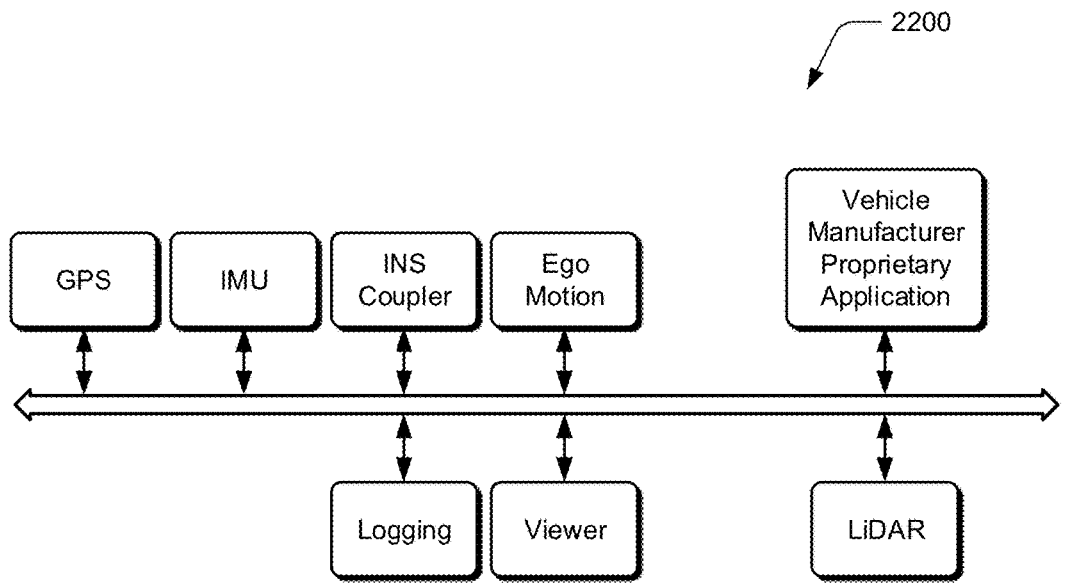

FIGS. 20, 21, and 22 illustrate respective examples 2000, 2100, and 2200 of the PolySync system and PolySync Viewer features of the system architecture 800 that incorporates the manager-node architecture 1100 to implement embodiments of an autonomous vehicle platform and safety architecture, as shown and described herein. In the example 2000 shown in FIG. 20, PolySync provides layers of abstraction between low-level data and high-level data, and the PolySync API allows complex software applications to be built invariant to changes in hardware configuration. The applications can include vehicle manufacturers' applications and/or processing nodes (e.g., nodes in C, C++, Matlab/Simulink, etc.). Low-level inputs (e.g., sensor inputs) can be received into an abstraction layer, and mapped to broad sensor categories. The example 2100 shown in FIG. 21 illustrates that PolySync can determine and answer the basic question of "what is around me?", such as for a vehicle, with function calls of PSYNC_GetAllTracks( ) to the PolySync feature of the architecture.

The example 2200 shown in FIG. 22 illustrates that PolySync can be implemented to be fast, scalable, modular, and embeddable for prototype applications all the way up to production deployments, having one tool for the entire program. The many features of PolySync can include any one or combination of distributed computing, a scalable bus over Ethernet (NIC teaming), automated sensor discovery and binding, time stamp correction, high bandwidth streaming, GPU-based video compression and decompression, 100% integrity logging, access to low and high-level data types, filtering functions, system health status monitoring, software E-stop, security access controls, data fusion, and INS coupling. The many functions of PolySync and/or PolySync Viewer can include at least sensing, perception, control, actuation, mission planning, short-term path planning, behaviors, road modeling, a user interface, visualization, and logging, as well as any other functions and/or features that may be implemented for an autonomous vehicle platform and safety architecture.

Figure 23:
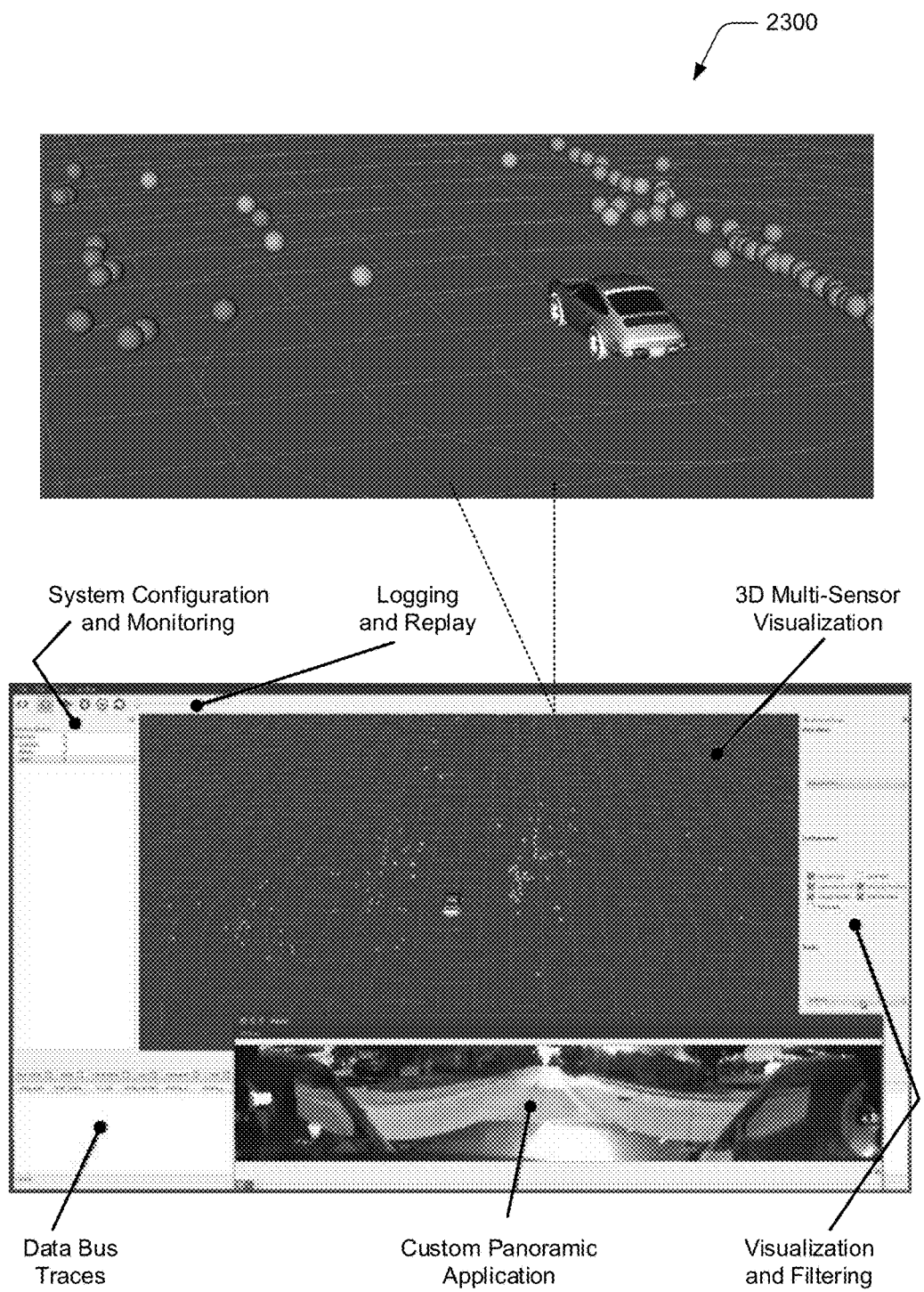

FIG. 23 illustrates an example 2300 of the PolySync Viewer feature of the system architectures that implement embodiments of an autonomous vehicle platform and safety architecture, as shown and described herein. In this example 2300, PolySync Viewer provides a visualization, logging and playback, and configuration component that is built on the PolySync API. This tool enables plug-and-play visualization of all system sensors, logging and playback, system configuration, and health monitoring of the system. PolySync Viewer supports custom user applications via a plugin framework in multiple languages. Additional features of PolySync Viewer can include any one or combination of rapid user application development (e.g., in QML, C++, etc.), multi-signal plotting, synchronized seek and time-step playback (including video), sensor position setup GUI, system node setup and health monitoring, multiple 3D visualization modes and views, a rich data filtering interface, and real-time full bus traces, as well as any other functions and/or features that may be implemented for an autonomous vehicle platform and safety architecture.

Figure 24:
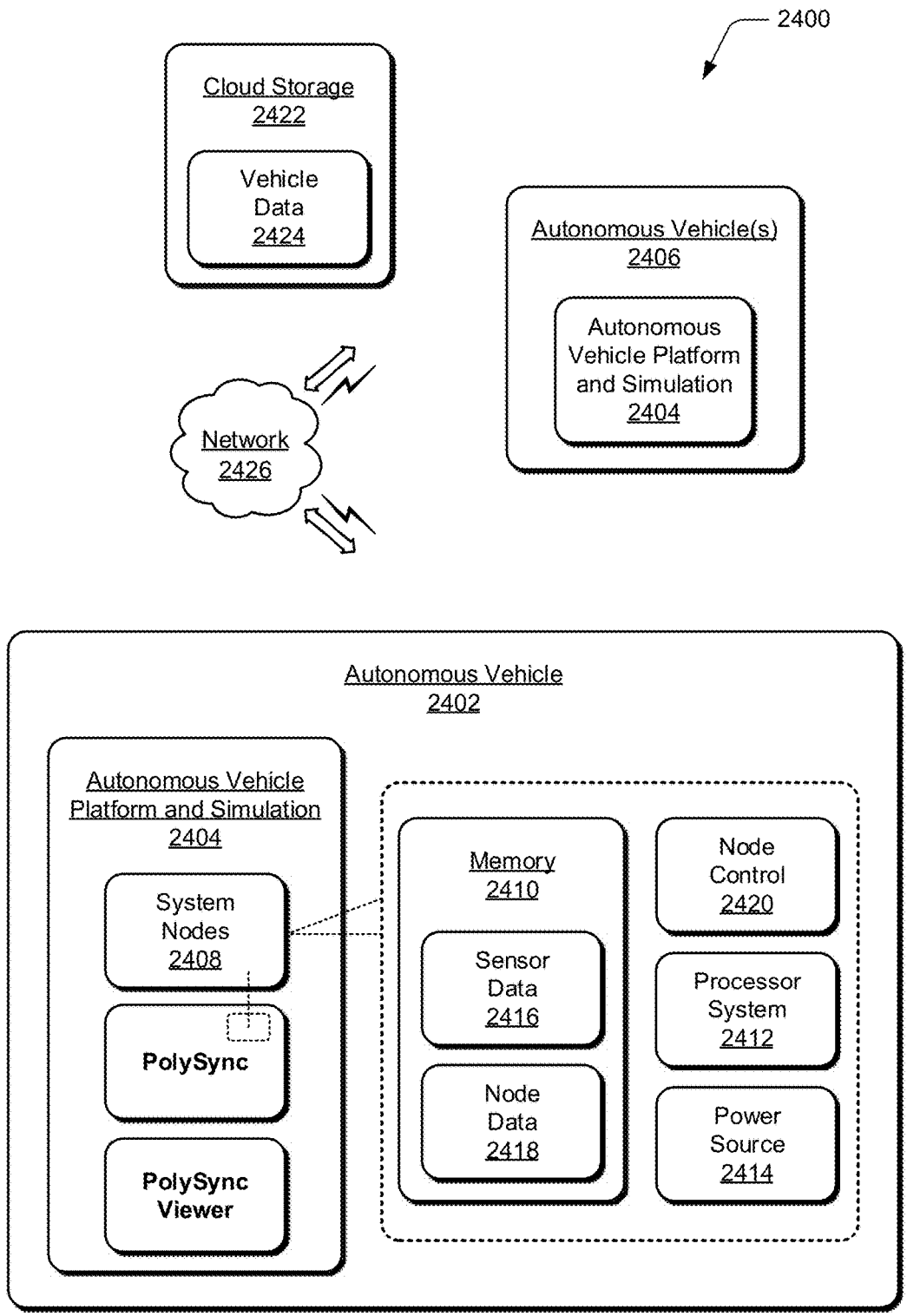
FIG. 24 illustrates an example system in which embodiments of an autonomous vehicle platform and safety architecture can be implemented.

FIG. 24 illustrates an example system 2400 that implements an autonomous vehicle platform and safety architecture in accordance with one or more embodiments. The example system includes an autonomous vehicle 2402 that is implemented with an autonomous vehicle platform and simulation 2404 as described herein. The example system 2400 may also include one or more additional autonomous vehicles 2406. The autonomous vehicle platform and simulation 2404 includes the PolySync and PolySync Viewer features described herein, as well as the independent system nodes 2408 of the distributed architecture.

Any of the system nodes 2408 can be implemented with various components, such as a processing system and memory, as well as any number and combination of differing components as further described with reference to the example device shown in FIG. 25. For example, a sensor node includes a memory 2410, a processor system 2412, and a power source 2414, such as any type of battery or other power source that may be implemented in an autonomous vehicle. The memory 2410 of the sensor node can maintain sensor data 2416 (e.g., low-level sensor data received from a sensor), as well as node data 2418, such as processed node data (e.g., high-level system data), configurable settings of the sensor node, and any other type of node data.

The system nodes 2408 include node control 2420 that can be maintained as executable instructions (e.g., a software application, component, or module) stored on computer-readable storage memory, such as any suitable memory device or electronic data storage (e.g., the memory 2410). Additionally, the node control can be executed with the processor system 2412 of the sensor node to implement embodiments of the autonomous vehicle platform and safety architecture. For example, the node control of a system node is implemented to perform various method operations to implement embodiments and features of an autonomous vehicle platform and safety architecture.

In implementations, components of the autonomous vehicle platform and simulation 2404 may also communicate to store any type of the node data 2418 and/or any other type of architecture information in network-based data storage (also referred to as cloud-based, or "in the cloud"), shown as cloud storage 2422 that stores vehicle data 2424. Further, any of the autonomous vehicle platform and simulations 2404 and/or system nodes 2408 described herein can communicate via a network 2426, which can be implemented to include a wired and/or a wireless network. The network can also be implemented using any type of network topology (e.g., a mesh network) and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments, an autonomous vehicle platform and simulation can be implemented for any one or combination of features, including but not limited to, sensing, perception, control, actuation, mission and path planning, behavior determinations, road modeling, user interface, visualization, and data logging. For example, a collision alert system that provides audible feedback for following distance may utilize radar as a spatial sensor to identify targets (e.g., other vehicles, pedestrians, and/or objects, both moving and stationary) in front of the vehicle, and utilize odometry and gyroscope sensors to sense vehicle speed and direction. A perception algorithm can then perform ego motion correction and identify targets as vehicles. A behavior algorithm can then determine whether or not to output an alert to an actuator, such as an audible buzzer.

As described above, conventional autonomous vehicle systems are designed with an interdependent data architecture, as shown and described with reference to FIG. 1, and are both technology-centric and algorithm-centric. This makes the conventional systems difficult to implement, support, upgrade, and/or troubleshoot, all of which are essential for a production-level computing system. In embodiments of the autonomous vehicle platform and safety architecture described herein, the system is distributed as a multitude of nodes having functional elements with consistent messaging formats that create a uniform API for interacting with each sensor node, component, and module. The API calls can be uniform for the system architecture, such as PolySync connect, PolySync register, PolySync publish, PolySync subscribe, and any other type of related PolySync and/or PolySync Viewer API call.

All of the different system nodes operate over a shared, near real-time bus (or via a multiple, redundant bus structure) on one or more computing devices, both at a sensor node and/or on multiple distributed devices, in a form of peer-to-peer communication network of the publisher, subscriber architecture nodes. Combined with standardized messaging, this architecture allows easy swap between different modules without tracing dependencies. Each of the nodes can be implemented to operate independently and without knowledge of the other system nodes.

For robustness, the system nodes may be reduced in functionality, increasing the number of nodes on the network, each implemented for a single purpose. For instance, a general controller area network (CAN) parser node would decode CAN data from a radar sensor and make it available on the real-time bus and/or network. A second node can translate the raw CAN data into a spatial messaging format, while a third node may take GPS/IMU (Inertial Measurement Unit) and radar data, perform ego motion and reference frame correction, and make the more generalized data available on the real-time bus and/or network. In this way, levels of abstraction are built in from the low-level data immediately, and in this described example, the sensor-specific node would be the radar translation node. To later upgrade the sensor, a programmer would only need to add the appropriate translation node and the system would work.

In embodiments of an autonomous vehicle platform and safety architecture, generalized messaging formats are utilized for the API, and the messaging formats include, but are not limited to: spatial/ranging formats for remote ranging sensors, such as LiDAR, radar, camera, ultrasonics, and others; a localization format for sensors providing vehicle pose, location, and dynamic information including GPS, inertial, odometry (including visual), etc.; a video format for video frames (usually compressed); a mission planning format for high-level behaviors and waypoint management; a path planning format for vehicle route path planning; a perception format for perception of objects, such as drivable surfaces, object recognition, lane modeling, etc.; a World model format for full environment modeling; a control format for actuation command and feedback; a heartbeat format that provides continuous operational and/or error status for each node of the architecture, referred to as the "health" of the system; and a "diagnostic" format that includes appended error traces and node operating states. In addition, embodiments of the autonomous vehicle platform and safety architecture allow for flexible low-level data types, such as CAN data, Ethernet packets, serial packets, etc. Users (e.g., vehicle manufacturers) may implement their own data formats to handle customized inter-process communication and high bandwidth pipelining.

The modular data structure of the system architecture solves a multitude of problems in implementing, maintaining, and upgrading autonomous vehicle systems. Utilizing the real-time bus and data model, an autonomous system can be deployed as a series of modules, and sensing systems, algorithms, and actuators can be interchanged easily without disrupting the core functionality or stability of the system. The modularity of the architecture provides a significant commercial opportunity for companies to build and supply the modules and components of the architecture as self-contained products that can be developed and upgraded over time. Companies that desire to develop autonomy systems are not forced to hire from the limited pool of competent engineers and scientists, but instead may simply purchase the required modules to enable desired system functionality. Further, the modularity offers the ability to create alternate configurations, all utilizing the standard API calls. For example, instead of a full autonomy system, a company may be interested only in adaptive cruise control (ACC) functionality. Being extensible, the bus adapts accordingly. If the company later wishes to expand to additional functionality (or even full autonomy), the previous system and sensors are easily expanded to incorporate the additional functionality. Since all of the system nodes utilize the same API calls, they can be added to the real-time bus easily to instantly expand the capabilities.

An autonomous vehicle, or active safety systems in general, include a set of sensors that detect and provide information about the surrounding environment, and processing algorithms are implemented to determine what is really happening around a vehicle, and decision making algorithms determine what actions to take, followed by some sort of actuation to affect a change in response to the environment. The system utilizes sensors (e.g., hardware components and features) to detect what is going on in a surrounding environment, and then algorithms (e.g., software features) are utilized to determine what is actually happening in the environment. The challenge is when using a multitude of different sensors, such as multiple LiDAR sensors, multiple radar sensors, vision cameras, ultra-sonic sensors, temperature sensors, sound sensors, light sensors, and any other sensors that may be utilized for an autonomous vehicle system.

Each one of these different and multiple sensors operates with different idiosyncrasies and in different formats, such as over Ethernet, over CAN, they might be USB, and the list goes on. The multitude of different sensors also typically operate asynchronously, providing sensor data out at whatever the specified data rate is that they operate, such as every fifty (50) milliseconds, a burst of sensor data is output for processing. Accordingly, a developer of autonomy or active safety systems has to start an autonomous system program at that level, and has to know or learn Ethernet protocols, CAN protocols, LVDS, USB, as well as figure out the system architecture to be able to bring all the data together and process the data (referred to as data fusion) without too much lag time to determine what the data represents.

Further, the sensor data from the sensor detections all need to be correlated to a single timestamp (e.g., a unified time domain) to correlate when the sensor detections happen in relation to one another so as to accurately ascertain where targets (e.g., other vehicles, pedestrians, roadways, and other objects) are in the surrounding environment and what is happening at that particular moment in time in the surrounding environment. When the data is synchronously correlated, the events that are happening at that particular moment in time in the surrounding environment can be determined. Having correct correlated timestamps, or time order, has a huge effect on the reliability of an overall autonomous vehicle system.

For example, three different sensors may detect a target ("hits" on a target), and a perception algorithm (e.g., a software application) can then determine from a cluster of data from the three different sensors at the location that the target has certain properties, and is likely another vehicle (with some percentage of certainty). Given determined objects (targets) in an environment, the autonomous vehicle platform and safety architecture can determine how to navigate from one point to the next without hitting the objects. This feature can be implemented by path planning algorithms (e.g., software applications). The system can include a low-level path finding algorithm, such as to determine how to navigate one block of a street, or from a stop sign to the next light, without hitting something. The system can also include a high-level path planning algorithm, such as to determine a path from one city to the next.

From a business standpoint, automotive and other vehicle manufacturers generally tend to focus on the high-level path planning algorithms that are layered above the sensor detection and sensor data processing to determine target location. However, the well-designed, underlying autonomous vehicle platform and simulation is clearly an important and needed architecture of an overall autonomous vehicle system. In embodiments, the autonomous vehicle platform and safety architecture is a distributed architecture, rather than having on computer managing all of the system nodes, and the one computer fails, then the whole system goes down. With the distributed architecture, the multitude of different computer devices are decentralized and can host different processing modules, so that if one computer device or node fails, it doesn't shut down the whole system. The system nodes on the real-time bus are uniquely identified and can replicate, replace, and/or switch out a node (e.g., a failed or replacement node) based on which nodes are registered and receiving different types of the system data.

In implementations of the autonomous vehicle platform and safety architecture, a sensor node may be a module receiving input from several sensors, or even several different types of sensors. Generally, each system node is designated to do one specific task, function, feature, etc. However, a unique aspect of the architecture is that all of the data is available to all of the system nodes, as-needed or designated. Conceptually, a single pipe communicates all of the system data for every sensor, module, component, etc. All of the data from every node in the system is available to every other node (e.g., module, component, computer device, etc.) that might be on the system. For example, five radars may generate the raw CAN data, and any of the nodes can receive and parse the CAN data into high-level data types. Generally, any of the system data is not just piped from a point to another point, but rather is available anytime on the real-time bus. The data is published on the real-time bus in the publisher-subscriber architecture in real-time, as opposed to a transmit-and-receive architecture where a node would first have to request the data, receive confirmation that the data will be sent, and then receive the data.

In implementations, a designated node may be providing information that is relied on, and if that node fails, the failure can be detected and a command sent to a different node to kick off the failed node and restart the lost node functions or operations on the different node, or on any one of the other nodes. Similarly, two different nodes may parse the same data, and the two nodes can validate each other for a higher confidence of reliable data. Additionally, if one of the nodes fails, the parsed data will still be available from the other operational node.

In embodiments, the autonomous vehicle platform and safety architecture is implemented for plug-and-play of the various system nodes. As noted above, the many different sensors of a conventional system typically operate with many different protocols and have different idiosyncrasies as to how they operate. Typically, a programmer who is developing an autonomous vehicle system would have to learn how all of the different sensors operate and many different protocols to implement the system. In implementations, the PolySync features of the system architecture can recognize a sensor type, such as a radar component, and will abstract the data from the radar to a high-level radar data type.

The system architecture implements a database of what is available in the system. For example, the system may support a hundred different types of sensors, and can progressively go through each one based on the data stored in the database and test an input until a sensor type is determined. For every different sensor in the overall architecture, the system is implemented to receive sensor data from a new sensor and perform an analysis on the data to make a determination as to the likely sensor model and type. Then the next time that the system is started up, the autonomous vehicle platform and simulation will have the prior knowledge of the system node configurations, and can start up with a much faster response time. This feature is also referred to as "headless", in that the first time the system is initialized, the visualizer feature (e.g., a GUI of the PolySync Viewer feature) can be used to progress through a setup wizard for the initialization process, and on the next power-up, the system nodes do not need to log-in or register on the system.

Once the system is configured, developers for the automobile and other vehicle manufacturers can write their code and communicate with the architecture system when it is powered up via the autonomous vehicle platform and simulation. The autonomous vehicle platform and safety architecture may also be referred to and/or implemented as a sensor and/or autonomy operating system, where in that context, the autonomous vehicle platform and safety architecture is preconfigured to include the drivers for the sensors. The drivers are preconfigured and the system unifies and generalizes the data communication between the system nodes so that they are not all different, specific types of data for the many different types of sensors. The system architecture handles the problem of being blind to what sensors, components, modules, etc. may be providing input, and sampling the data input for comparison to the internal system definitions to determine the sensors, components, and modules, and to associate them.

As described above, the sensors of an autonomous vehicle system operate and generate sensor data asynchronously, and need timestamp correction so that they are all in a single time context. Unlike a conventional operating system that uses a scheduler to schedule and complete tasks, or a real-time operating system (RTOS) that has only limited access to libraries and other features, implementations of the autonomous vehicle platform and safety architecture utilize the hardware timestamps generated by the individual components at the system nodes and corrects them for the system time, which is synched across all of the systems. For example, the CAN modules provide a hardware timestamp, and the Ethernet sensors typically provide a hardware timestamp. Although the timestamps may be different from the many different system nodes, each node is consistent in the timestamp that is communicated from a respective system node. In some circumstances, custom drivers provide system time stamps on incoming data with very low latency.

The timestamps from the system nodes are corrected for the system time, which is synched across all of the systems, based on Network Time Protocol, which is set from GPS signals (because GPS has an absolute timestamp that is universal among all GPS). The GPS corrects the Network Time Protocol, which allows the autonomous vehicle platform and safety architecture to correct the sensor time, and correlate all of the different timestamps in a format that is a single time domain. This is also useful in a multi-vehicle application because now all of the vehicles will be running on the same time domain.

In implementations, the real-time bus of the system architecture can be expanded to encompass other vehicles, such as for a convoy of multiple vehicles traveling in a line. All of the vehicles can share access to the same real-time bus via wireless communication, where the last vehicle in the convoy would have access to the raw system node data that is being produced by the lead vehicle in the convoy. As long as all of the vehicles in a convoy, or components in a system, are in the same time domain, it doesn't matter their physical location or what they are doing, because the overall system architecture can bring the data together anywhere. These features allow the autonomous vehicle platform and safety architecture to synch control systems, all based on the universal timestamp. Although having a wireless network between convoy vehicles has been implemented, conventional systems do not interact with the core vehicle systems, creating and allowing universal access on a single time domain. For example, if there was a node fault or failure in the second convoy vehicle, then the second vehicle can use the side scanning radar of the lead vehicle to replace what has failed in the autonomous vehicle system of the second vehicle (e.g., using other vehicle sensors to supplement failures). Similarly, embodiments of an autonomous vehicle platform and safety architecture can be implemented for any autonomous vehicle and/or any coordinated vehicle system.

When all of the system nodes data and/or sensor data is correlated within the same time, the data can be parsed into flexible data types (also referred to as abstracted data types). In implementations, the autonomous vehicle platform and safety architecture abstracts the low-level data up to high-level data types, which means that the system nodes can be built on top of the abstracted data types, and the abstracted data types remain invariant, even with respect to changes in the sensor technology or configuration. This is significant because the algorithms do not have to be rewritten or tailored for specific sensors each time that a sensor is swapped out, or when a system node fails and a redundant node replaces the failed node. The flexible data types can be implemented as an abstract container type that is generic, and an object container includes data for position, velocity, acceleration, status, classification, and/or any other type of generalized data, such as for radar, LiDAR, CAN data, Ethernet data, etc. From an API standpoint, a programmer can subscribe to various topics from the PolySync bus, such as to subscribe and receive all of the radar data, or to get all LiDAR points, or get all objects. Further, the PolySync Viewer is built on the API, and a customer (e.g., automobile or other vehicle manufacturer) can build a custom system node right on the bus, and have access to all of the data on the real-time bus, such as to build a path planner, a perception algorithm, or one of the higher-level algorithms. Visualization-only algorithms can be easily prototyped as plugins to the PolySync Viewer rendering pipeline itself.

Another aspect of the autonomous vehicle platform and safety architecture is a database file that stores the parsing information so it can be determined which signals correspond to what information. For example, given low-level data, the system can obtain specific data from particular sensors, such as a particular binary chunk of bits that indicate a range, and another binary chunk of bits that indicate an angle, and the like. When a new parser or a new sensor is added to the system, this data base file can be updated and then just redistributed, rather than having to redistribute the all of the API codes and related data. This indicates to the system how to parse new sensor.

In implementations, the autonomous vehicle platform and safety architecture includes a parser node that can be instructed to bind to a sensor, which initiates a look up in the data base for the sensor details to be able to parse the sensor. This feature provides that the coding of the system node never changes, but rather, it's just the database file that changes, which indicates how the node is to operate given a particular input. Accordingly, the code for the parser node does not have to be rewritten every time a new sensor is added to the system, but rather, the definition is just written in the file and provided to the node as a single change of the system. The database file is universal, and updates or new versions can be easily provided to a customer, rather than updating the whole system.

In implementations, the autonomous vehicle platform and safety architecture includes diagnostic and error checking. For example, a heartbeat message is a continuous signal that is communicated to indicate that status is okay. A diagnostic system implements state and diagnostic system messages, and includes a feature for error traces, such as to track an error propagation path through the system nodes. For example, a node may experience a hardware error associated with lack of power, and the error "travels", such as to a path planner node that relies on a sensor of the failed node. All of the system nodes see the fault message that is generated from the failed node, but the error does not necessarily affect all of the system nodes. The failed node generates the fault diagnostic message, indicating a time of the fault, type of fault, and other parameters associated with the fault. The fault diagnostic message is a container on the real-time bus, and then the failed node enters into a non-operational state (e.g., not running, not okay, wait, warn, and/or a 50% power state).

It is up to the rest of the system nodes whether or not to rely on the information. For example, the path planner node that actually uses that failed sensor gets the message and determines that the message was generated from a node that was being relied on. The path planner can then suspend its function, and enter into a failed or suspended state, and append its own diagnostic message onto the initial fault diagnostic message that was generated previously and communicate it back out. Thus, the diagnostic message now includes the path planner fault information, followed by the low-level fault information, and the times associated with the faults. A programmer can then track how the error traversed through the system architecture and the effect it had on the system.

All of the system nodes receive the information and can individually assess the effect of the error and whether or not to continue operation or enter into a fault state. For example, a system node may determine that LiDAR is no longer available, and attempt to determine whether to allow the vehicle to keep going based on having all of the radar inputs. The system node may assess an increased chance of a collision, so the vehicle may continue at a slower speed, as well as sending out a message to the rest of the system nodes requesting input as to whether to continue.

In implementations, the autonomous vehicle platform and safety architecture provides for multi-pathing and NIC-teaming, which allows implementation of high bandwidth pipes (e.g., the real-time bus). Generally, one Ethernet cable provides a gigabit and two Ethernet cables provide two times a gigabit, and there is automatic handling for creating that as one unified large pipe. The autonomous vehicle platform and safety architecture also implements multi-pathing, such as for communication of a large amount of camera data over the bus that would require a higher bandwidth. The feature of multi-pathing provides for redundancy if there is an error, or for example, if one of the main computers that is performing path planning or something really important is disabled. Alternatively or in addition, a cable may be cut and system nodes are then connected via alternate data communication cables. For example, the autonomous vehicle platform and safety architecture can be implemented to automatically detect the damaged or inoperable cable, and communicate an error state or diagnostic message to initiate a change in the networking path, such as to nearly instantaneously switch to an alternate data path.

In embodiments, the autonomous vehicle platform and safety architecture implements data fusion, from which to determine what is actually around a vehicle in the surrounding environment. Given the multitude of data from all of the many system nodes, sensors, components, modules, and the like, the data is filtered to determine whether targets or objects around the vehicle are another vehicle, a pedestrian, a wall, a road, a stationary or moving object, road lanes, etc. Identifiers can be created for targets that are then tracked based on the different types of sensors and different types of data. The system can dynamically select which of the sensors has more input to what a tracked object may be, and can be based on weighted priorities and/or confidences in the sensors and systems that are used to make the determinations. For example, the LiDAR information can be treated as highly reliable if a target is ascertained as a recognizable object, particularly when combined with camera imaging data. Generally, the autonomous vehicle platform and safety architecture can be implemented to receive multiple data streams (e.g., an arbitrary number of the data streams) and fuse them.

In implementations, there are many algorithms that can be developed on top of the system architecture to add value, such as for data fusion to determine objects and similarly for simultaneous localization and mapping (SLAM). The SLAM feature provides the ability to take data from an environmental spatial inputs, so say like a camera or a LiDAR or radar system, and to be able to move around in the environment and create a virtual map. By mapping the surrounding environment, and by virtue of creating the map, the system also localizes a vehicle within the environment.

The autonomous vehicle platform and safety architecture also implements data logging, and can log both a recording of a current session (e.g., a vehicle drive) and diagnostic messages, so that if anything goes wrong, there will be a record, black box style. In implementations, the system logs just the low-level data (e.g., sensor data, node data), rather than all of the messages on the bus, which doesn't scale well and can be impractical due to the repeated messages after processing. Each individual system node does its own recording, such as a sensor node for a sensor records the sensor data generated at the sensor node. This feature provides that developers can later develop algorithms and run test scenarios with the actual logged node data for simulated real-World testing by adding that processing node to the bus and propagating that low-level data back up through the system to see what happens when the new node is on the real-time bus.

The autonomous vehicle platform and safety architecture also implements a feature to configure different domains for different reliabilities. For example, a camera on a vehicle that is transmitting image data may have a logging node that is receiving the image data, deemed to be mission critical and set to be most reliable. Similarly, a viewer application may be receiving the same image data, and the viewer application is set to best effort on the reliable side, but may drop a couple of frames without causing concern. The quality of service is an important aspect of distributed systems in general because some data is critical and some is not, such as for control systems where the data may be critical. There are many system nodes, components, and modules of the system architecture that can be designated for quality of service.

The autonomous vehicle platform and safety architecture also implements multi-domain systems and control. For example, the physical real-time bus is a domain of the system architecture, and if two domains (e.g., real-time buses) are implemented, communication data traffic can be virtually isolated. The two domains can be connected, as well as they can be isolated, or one domain may be encrypted while the other one is not. The feature of isolation can be important for the autonomous vehicle platform and safety architecture when associated with control, such as to isolate the aspect of the vehicle that performs the control, so that the system can power it down unexpectedly in the event of a control error or something similar.

The autonomous vehicle platform and safety architecture also implements the feature of streams. In a typical networking architecture, a node of a system has a piece of data and publishes it to the data bus, and subsequent pieces of data are also published to the data bus as the data becomes available. The streams feature allows a system node to receive sample data that comes in quickly and, rather than publishing each piece of data on the bus as it is received, the system node packs up a list or a package of mini samples and then puts them on the real-time bus together at once. For example, each frame of image data may not be published, and the system waits until thirty (30) frames have been received, or one second's worth of data, and then publishes the image data on the real-time bus all at once. The system architecture can also perform image decompression and compression on the delayed streams of data.

Figure 25:
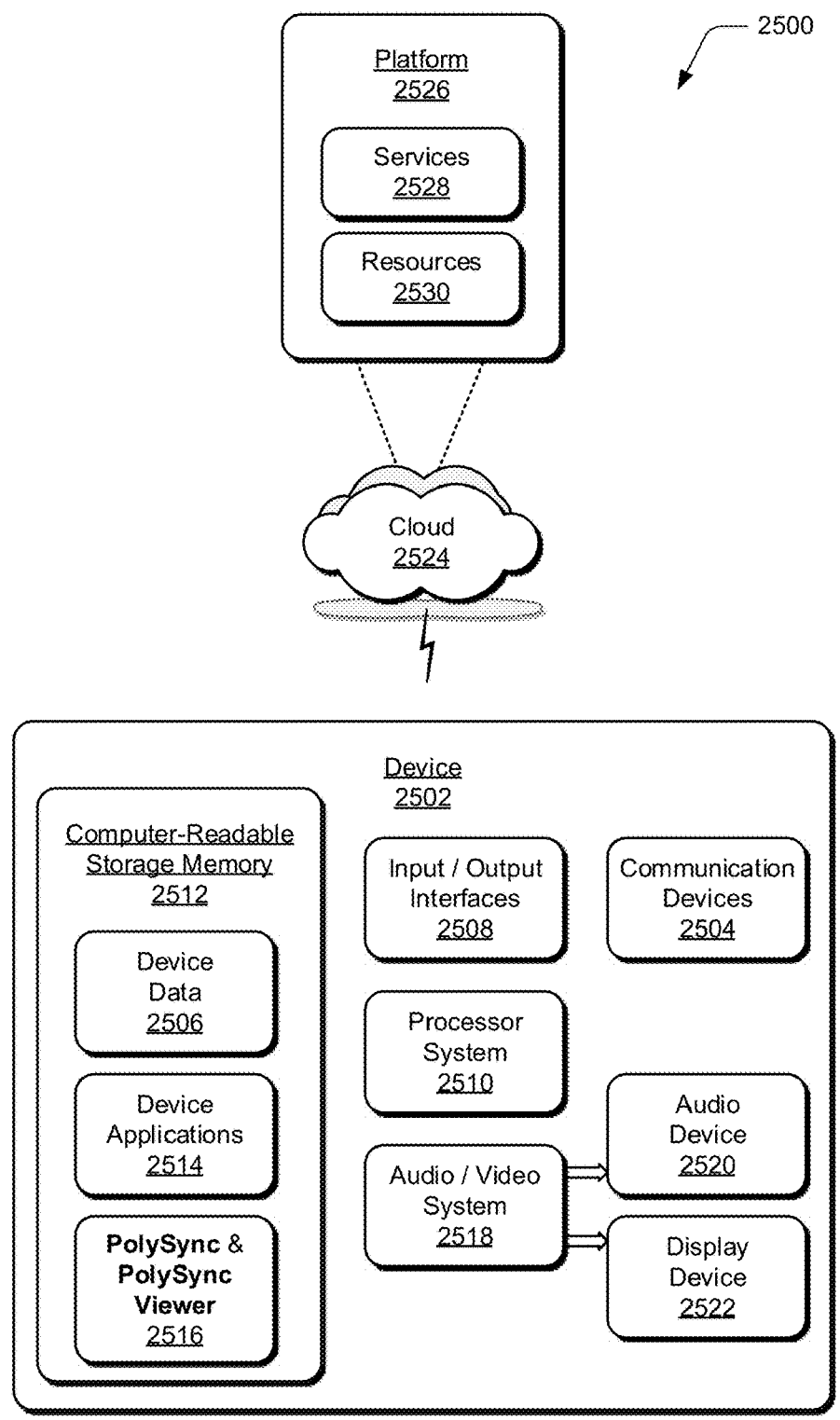
FIG. 25 illustrates an example system with an example device that can implement embodiments of an autonomous vehicle platform and safety architecture.

FIG. 25 illustrates an example system 2500 that includes an example device 2502, which can implement embodiments of an autonomous vehicle platform and safety architecture. The example device 2502 can be implemented as any devices and/or services (e.g., server devices) described with reference to the previous FIGS. 1-23, such as any type of sensor node in a distributed, autonomous vehicle system architecture. For example, each of the system nodes 2408 of the autonomous vehicle platform and simulation 2404 shown in FIG. 24 may be implemented as the example device 2502.

The device 2502 includes communication devices 2504 that enable wired and/or wireless communication of device data 2506, such as device settings and data, sensor data, and any other type of system data stored on the device. The communication devices 2504 can also include transceivers for cellular phone communication and/or for network data communication.

The device 2502 also includes input/output (I/O) interfaces 2508, such as data network interfaces that provide connection and/or communication links between the device, data networks, and other devices. The I/O interfaces can be used to couple the device to any type of sensors, components, peripherals, and/or accessory devices, such as a touchscreen display surface that may be integrated with the device 2502. The I/O interfaces also include data input ports via which any type of data, media content, and/or inputs can be received, such as user inputs to the device, as well as any type of audio, video, and/or image data received from any sensor, content, and/or data source.

The device 2502 includes a processor system 2510 of one or more processors (e.g., any of microprocessors, multi-core processors, controllers, and the like) and/or a processor and memory system (e.g., implemented in an SoC) that processes computer-executable instructions. The processor system can include a digital signal processing (DSP) subsystem for processing signals and data of the device. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternatively or in addition, the device 2502 can be implemented with any one or combination of software, hardware, firmware, or fixed logic circuitry that is implemented in connection with processing and control circuits, which are generally identified at 2510. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 2502 also includes computer-readable storage memory 2512, such as data storage devices that can be accessed by a computing device, and that provide persistent storage of data and executable instructions (e.g., software applications, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 2512 provides storage of the device data 2506 and various device applications 2514, such as an operating system that is maintained as a software application with the computer-readable storage memory and executed by the processor system 2510. In this example, the device applications also include any of the PolySync and PolySync Viewer features 2516 that implement embodiments of an autonomous vehicle platform and safety architecture, such as when the example device 2502 is implemented as a sensor node of the distributed architecture.

The device 2502 also includes an audio and/or video system 2518 that generates audio data for an audio device 2520 and/or generates display data for a display device 2522 (e.g., a touchscreen display surface). The audio device and/or the display device include any devices that process, display, and/or otherwise render audio, video, display, and/or image data, such as the image content of the PolySync Viewer features. In implementations, the audio device and/or the display device are integrated components of the example device 2502. Alternatively, the audio device and/or the display device are external, peripheral components to the example device.

In embodiments, at least part of the techniques described for an autonomous vehicle platform and safety architecture may be implemented in a distributed system, such as over a "cloud" 2524 in a platform 2526. The cloud 2524 includes and/or is representative of the platform 2526 for services 2528 and/or resources 2430. The platform 2526 abstracts underlying functionality of hardware, such as server devices (e.g., included in the services 2528) and/or software resources (e.g., included as the resources 2430), and connects the example device 2502 with other devices, servers, autonomous vehicle systems, etc.

The resources 2530 may include applications and/or data that can be utilized while computer processing is executed on servers that are remote from the example device 2502. Additionally, the services 2528 and/or the resources 2530 may facilitate subscriber network services, such as over the Internet, a cellular network, or Wi-Fi network. The platform 2526 may also serve to abstract and scale resources to service a demand for the resources 2530 that are implemented via the platform, such as in an interconnected device embodiment with functionality distributed throughout the system 2500. For example, the functionality may be implemented in part at the example device 2502 as well as via the platform 2526 that abstracts the functionality of the cloud 2524. In implementations, an individual autonomous vehicle system may include the device 2502, an implementation of the cloud 2524 for storage, and the platform 2526.

Although aspects of an autonomous vehicle platform and safety architecture have been described in language specific to features and/or methods, the appended claims are not necessarily limited to the specific features or methods described. Rather, the specific features and methods are disclosed as example implementations of an autonomous vehicle platform and safety architecture, and other equivalent features and methods are intended to be within the scope of the appended claims. Further, various different aspects are described and it is to be appreciated that each described aspect can be implemented independently or in connection with one or more other described aspects.

The invention claimed is:

1. A method implemented in a safety-critical system to enable continued safe operations with failed components, the method comprising:
  monitoring at least three components of the safety-critical system for output communicated over a system bus, the at least three components configured to produce the output indicative of a same event independently from the other components by using different input information than the other components;
comparing the outputs of the at least three components to determine whether each of the outputs indicates occurrence of the same event;
responsive to determining that a different output of one component does not indicate the occurrence of the same event as the outputs of the other components that do indicate the occurrence of the same event, identifying the one component as having failed; and
using the outputs of the other components to continue the safe operations of the safety-critical system without using the different output of the failed component.

2. The method as described in claim 1, wherein the safety-critical system is an autonomous vehicle.

3. The method as described in claim 1, further comprising instantiating safety managers that correspond to the at least three components based on incorporation of the at least three components into the safety-critical system.

4. The method as described in claim 3, wherein the monitoring, the comparing, and the identifying is performed by the safety managers.

5. The method as described in claim 4, wherein:
the safety managers communicate over a safety virtual bus to perform at least one of the monitoring, the comparing, the identifying, and the using; and
the safety virtual bus is different from a primary virtual bus that the at least three components use to communicate, one to another, to carry out operations of the safety-critical system.

6. The method as described in claim 1, further comprising attempting to restore the failed component, the failed component being restored when the different output of the failed component meets one or more output criteria defined for the failed component.

7. The method as described in claim 6, further comprising:
responsive to restoring the failed component, including updated output of the restored component in further comparisons with the outputs of the other components; and
determining whether each of the outputs indicates occurrence of a new same event.

8. The method as described in claim 1, further comprising:
monitoring the other components for additional output communicated over the system bus; and
comparing the additional outputs of the other components to determine whether each of the additional outputs indicate the occurrence of the same event.

9. The method as described in claim 8, further comprising:
responsive to determining that the additional outputs of the other components do not both indicate the occurrence of the same event, identifying the safety-critical system as having failed; and
responsive to identifying the safety-critical system has failed, causing the safety-critical system to carry out one or more mitigation actions to at least temporarily discontinue operation of the safety-critical system.

10. The method as described in claim 1, wherein the safety-critical system comprises a plurality of components each associated with predefined criteria that describe characteristics of the output that are indicative of normal operation for a respective component.

11. The method as described in claim 10, wherein the characteristics include at least one of an output format and output timing.

12. The method as described in claim 10, further comprising:
checking the outputs of the plurality of components to determine whether the outputs of the plurality of components meet the predefined criteria;
responsive to determining that the output of a given component does not meet the predefined criteria, identifying the given component as having failed; and
causing the safety-critical system to operate without using the output of the given component.

13. A safety-critical system comprising:
a plurality of components to support operations of the safety-critical system; and
a safety architecture implemented to enable the safety-critical system to continue operations with failed components, the safety architecture including safety managers instantiated for the plurality of components, each safety manager instantiated to:
monitor output of a respective component of the plurality of components to determine whether the output of the respective component indicates occurrence of a same event as the outputs of linked components of the plurality of components, the respective and linked components configured to produce the output indicative of the same event independently based on different input information;
responsive to a determination that the output of the respective component does not indicate the occurrence of the same event and the outputs of the linked components do indicate the occurrence of the same event, identify the respective component as having failed; and
notify the safety managers that the output of the respective component is not to be used to carry out one or more of the operations of the safety-critical system.

14. The safety-critical system as described in claim 13, wherein each of the safety managers is further instantiated to:
responsive to a determination that the output of one of the linked components does not indicate the occurrence of the same event and outputs of the other linked components and the respective component do indicate the occurrence of the same event, identify the one linked component as having failed;
notify the safety managers that the output of the one linked component is not to be used to carry out the one or more operations of the safety-critical system; and
cause the outputs of the other linked components and the respective component to be used to carry out the one or more operations of the safety-critical system without using the output of the one linked component.

15. The safety-critical system as described in claim 13, wherein each component of the plurality of components supports at least one of:
perception operations for sensing conditions of an environment in which the safety-critical system operates;
planning operations for determining one or more actions for the safety-critical system based on sensed conditions; and
control operations for causing the safety-critical system to carry out planned actions.

16. The safety-critical system as described in claim 13, wherein the safety-critical system is an autonomous vehicle and each component of the plurality of components supports at least one of:
perception operations for sensing conditions of a driving environment for the autonomous vehicle;

route planning operations for planning a route for the autonomous vehicle through the driving environment based on sensed conditions and a destination; and control operations for causing the autonomous vehicle to follow the route.

17. The safety-critical system as described in claim 13, wherein:

the safety architecture includes a safety virtual bus;

the safety managers are further configured to communicate information about the component failures over the safety virtual bus; and the safety virtual bus is different from a primary virtual bus that the plurality of components uses to communicate, one to another, to carry out the operations of the safety-critical system.

18. The safety-critical system as described in claim 13, wherein the safety-critical system is a virtual autonomous vehicle configured to drive through a simulated driving environment to test one or more autonomous vehicle components.

19. An autonomous vehicle comprising:

a plurality of vehicle components to support driving the autonomous vehicle through a driving environment; and a safety architecture implemented to enable the autonomous vehicle to continue driving safely with failed components, the safety architecture including safety managers instantiated for the plurality of vehicle components, each safety manager instantiated to:

analyze outputs of at least three linked components of the plurality of vehicle components to determine whether each of the outputs indicates occurrence of a same event, the at least three linked components configured to produce the output indicative of a same event independently from the other linked components by using different input information than the other linked components;

responsive to determining that a different output of one linked component does not indicate the occurrence of the same event as the outputs of the other linked components that do indicate the occurrence of the same event, identify the one linked component as having failed; and cause the outputs of the other linked components to be used in connection with driving the autonomous vehicle through the driving environment without using the different output of the failed component.

20. The autonomous vehicle as described in claim 19, wherein analysis of the outputs of the at least three linked component includes determining whether the outputs of the at least three linked components match criteria that describe characteristics of the outputs that are indicative of normal operation of the at least three linked components.

* * * * *